(12) United States Patent
Shinosaki et al.

(10) Patent No.: US 10,592,174 B2
(45) Date of Patent: Mar. 17, 2020

(54) INFORMATION PROCESSING SYSTEM, SERVER AND NON-TRANSITORY COMPUTER-READABLE RECORDING MEDIUM ENCODED WITH DATA DISTRIBUTION PROGRAM

(71) Applicant: Konica Minolta, Inc., Chiyoda-ku, Tokyo (JP)

(72) Inventors: Yusuke Shinosaki, Amagasaki (JP); Hiroaki Sugimoto, Nagoya (JP); Kazuhiro Tomiyasu, Toyokawa (JP); Kazuaki Kanai, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/813,271

(22) Filed: Nov. 15, 2017

(65) Prior Publication Data
US 2018/0136882 A1    May 17, 2018

(30) Foreign Application Priority Data
Nov. 15, 2016    (JP) .................................. 2016-222452

(51) Int. Cl.
  *G06F 15/00*    (2006.01)
  *G06F 3/12*    (2006.01)
  (Continued)

(52) U.S. Cl.
  CPC .............. *G06F 3/121* (2013.01); *G06F 3/122* (2013.01); *G06F 3/1229* (2013.01);
  (Continued)

(58) Field of Classification Search
  CPC ...... G06F 3/121; G06F 3/1224; G06F 3/1236; G06F 3/1275; H04L 67/1008; H04L 67/28; H04N 1/00344
  (Continued)

(56) References Cited

U.S. PATENT DOCUMENTS 8,054,485 B2 * 11/2011 Berglin ................. G06F 3/1205
                                                        358/1.14
2004/0158654 A1 * 8/2004 Shima ................ H04N 1/32545
                                                        710/8
(Continued)

FOREIGN PATENT DOCUMENTS

JP         2004-40142 A      2/2004
JP         2014-106727 A     6/2014

*Primary Examiner* — Mark R Milia
(74) *Attorney, Agent, or Firm* — Buchanan, Ingersoll & Rooney PC

(57) ABSTRACT

A first hardware processor included in a server determines one or more candidate apparatuses, which are candidates for being information processing apparatuses that execute a distribution process, based on performance of hardware resources, determines that an apparatus, which responds to an inquiry about whether the distribution process is executable, among the one or more candidate apparatuses is a proxy apparatus, and requests the proxy apparatus to execute the distribution process, and a second hardware processor included in each of a plurality of information processing apparatuses, in response to an inquiry about whether the distribution process is executable from the server, determines whether the distribution process is executable based on a margin of the hardware resources, and in the case where it is determined that the distribution process is executable, responds to the inquiry about whether the distribution process is executable.

34 Claims, 14 Drawing Sheets

(51) Int. Cl.
*H04L 29/08* (2006.01)
*H04N 1/00* (2006.01)
*H04L 12/66* (2006.01)

(52) U.S. Cl.
CPC .......... *G06F 3/1236* (2013.01); *G06F 3/1287* (2013.01); *H04L 67/1008* (2013.01); *H04L 67/28* (2013.01); *H04N 1/00344* (2013.01); *G06F 3/1224* (2013.01); *G06F 3/1275* (2013.01); *H04L 12/66* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 2008/0192293 | A1* | 8/2008 | Sugimoto | .......... H04N 1/00347 358/1.15 |
| 2008/0239376 | A1* | 10/2008 | Nishimi | ................ G06F 3/1204 358/1.15 |
| 2009/0284783 | A1* | 11/2009 | Kaneda | .............. H04N 1/00347 358/1.15 |

* cited by examiner

FIG. 7

| TROUBLE ID | CAUSE |
|---|---|
| 0001 | PROBLEM WITH CPU |
| 0002 | PROBLEM WITH FIXING DEVICE |
| 0003 | PROBLEM WITH TRANSFER BELT |

FIG. 8

| TROUBLE ID | GRACE TIME PERIOD | CAUSE |
|---|---|---|
| 1001 | 60 SECONDS | NO RESPONSE FROM SERVER |
| 1002 | 200 SECONDS | PACKET LOSS |
| 1003 | 15 SECONDS | PROBLEM WITH PROTOCOL |
| 1004 | 10 SECONDS | CONNECTION LOOP |
| 1005 | 300 SECONDS | PROBLEM WITH TRANSMISSION |

INFORMATION PROCESSING SYSTEM, SERVER AND NON-TRANSITORY COMPUTER-READABLE RECORDING MEDIUM ENCODED WITH DATA DISTRIBUTION PROGRAM

Japanese Patent Application No. 2016-222452 filed on Nov. 15, 2016 including description, claims, drawings, and abstract, the entire disclosure is incorporated herein by reference in its entirety.

BACKGROUND

Technological Field

The present invention relates to an information processing system, a server and a non-transitory computer-readable recording medium encoded with a data distribution program. In particular, the present invention relates to an information processing system for distributing the same data from one server to a plurality of information processing apparatuses, a server and a non-transitory computer-readable recording medium encoded with a data distribution program executed in a computer that controls the server.

Description of the Related Art

In recent years, an Multi Function Peripheral (hereinafter referred to as "MFP"), which is represented by an image forming apparatus, is often connected to a LAN (Local Area Network). A technique for efficiently using a plurality of MFPs in the case where the plurality of MFPs are connected to the LAN has been known. For example, it is described in Japanese Patent Laid-Open No. 2014-106727 that, in a server device which communicates with a plurality of image forming apparatuses and an information processing apparatus, configuration information of a job to be executed in any one of the image forming apparatuses is acquired from the information processing apparatus, an amount of standby power that is consumed due to an electric load of printing each page, and an amount of power consumption by a printing process of each page, during the data process for each page in the job, are accumulated in accordance with the acquired configuration information regarding each image forming apparatus, and the information processing apparatus is notified of device information that specifies an image forming apparatus having a low accumulation amount of power consumption.

However, the plurality of image forming apparatuses include an apparatus that is executing another job, and an apparatus that has not been used by anyone and have low power consumption. An amount of power corresponding to a state of each of the plurality of image forming apparatuses must be acquired from all of the plurality of image forming apparatuses. Thus, there is a problem that a load on the server device and a load on the network are increased.

SUMMARY

According to one aspect of the present invention, an information processing system includes a server and a plurality of information processing apparatuses communicable with the server, the server comprising a first hardware processor, and each of the plurality of information processing apparatuses comprising a second hardware processor, wherein the first hardware processor determines one or more candidate apparatuses, which are candidates for being information processing apparatuses that execute a distribution process of transmitting target data to each of one or more transmission destination apparatuses among the plurality of information processing apparatuses, based on performance of hardware resources required for the distribution process, inquires of the one or more candidate apparatuses about whether the distribution process is executable, and determines that an apparatus, which responds to an inquiry about whether the distribution process is executable, among the one or more candidate apparatuses, is a proxy apparatus, and requests the proxy apparatus to execute the distribution process, and the second hardware processor, in response to the inquiry about whether the distribution process is executable from the server, determines whether the distribution process is executable based on a margin of the hardware resources, and in the case where it is determined that the distribution process is executable, responds to the inquiry about whether the distribution process is executable.

According to another aspect of the present invention, a server includes a first hardware processor communicably connected to a plurality of information processing apparatuses, wherein the first hardware processor, determines one or more candidate apparatuses, which are candidates for being information processing apparatuses that execute the distribution process of transmitting target data to each of one or more transmission destination apparatuses among the plurality of information processing apparatuses, based on performance of hardware resources required for the distribution process, inquires of the one or more candidate apparatuses about whether the distribution process is executable such that each of the one or more candidate apparatuses determines whether the distribution process is executable based a margin of hardware resources used for execution of the distribution process, determines that an apparatus, which responds to an inquiry about whether the distribution process is executable, among the one or more candidate apparatuses is a proxy apparatus, and requests the proxy apparatus to execute the distribution process.

According to yet another aspect of the present invention, a non-transitory computer-readable recording medium is encoded with a data distribution program causing a computer, which controls a server communicably connected to a plurality of information processing apparatuses, to determine one or more candidate apparatuses, which are candidates for being information processing apparatuses that execute the distribution process of transmitting target data to each of one or more transmission destination apparatuses among the plurality of information processing apparatuses, based on performance of hardware resources required for the distribution process, and inquire of the one or more candidate apparatuses about whether the distribution process is executable such that each of the one or more candidate apparatuses determines whether the distribution process is executable based on a margin of hardware resources used for execution of the distribution process, determine that an apparatus, which responds to an inquiry about whether the distribution process is executable, among the one or more candidate apparatuses is a proxy apparatus, and request the proxy apparatus to execute the distribution process.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a diagram showing one example of an overview of an information processing system in one embodiment of the present invention;

FIG. 7 is a diagram showing one example of a first error table, which defines unrecoverable errors and is used as a reference in continuation determination;

FIG. 8 is a diagram showing one example of a second error table, which defines recoverable errors and is used as a reference in the continuation determination;

DETAILED DESCRIPTION OF EMBODIMENTS

Figure 1:
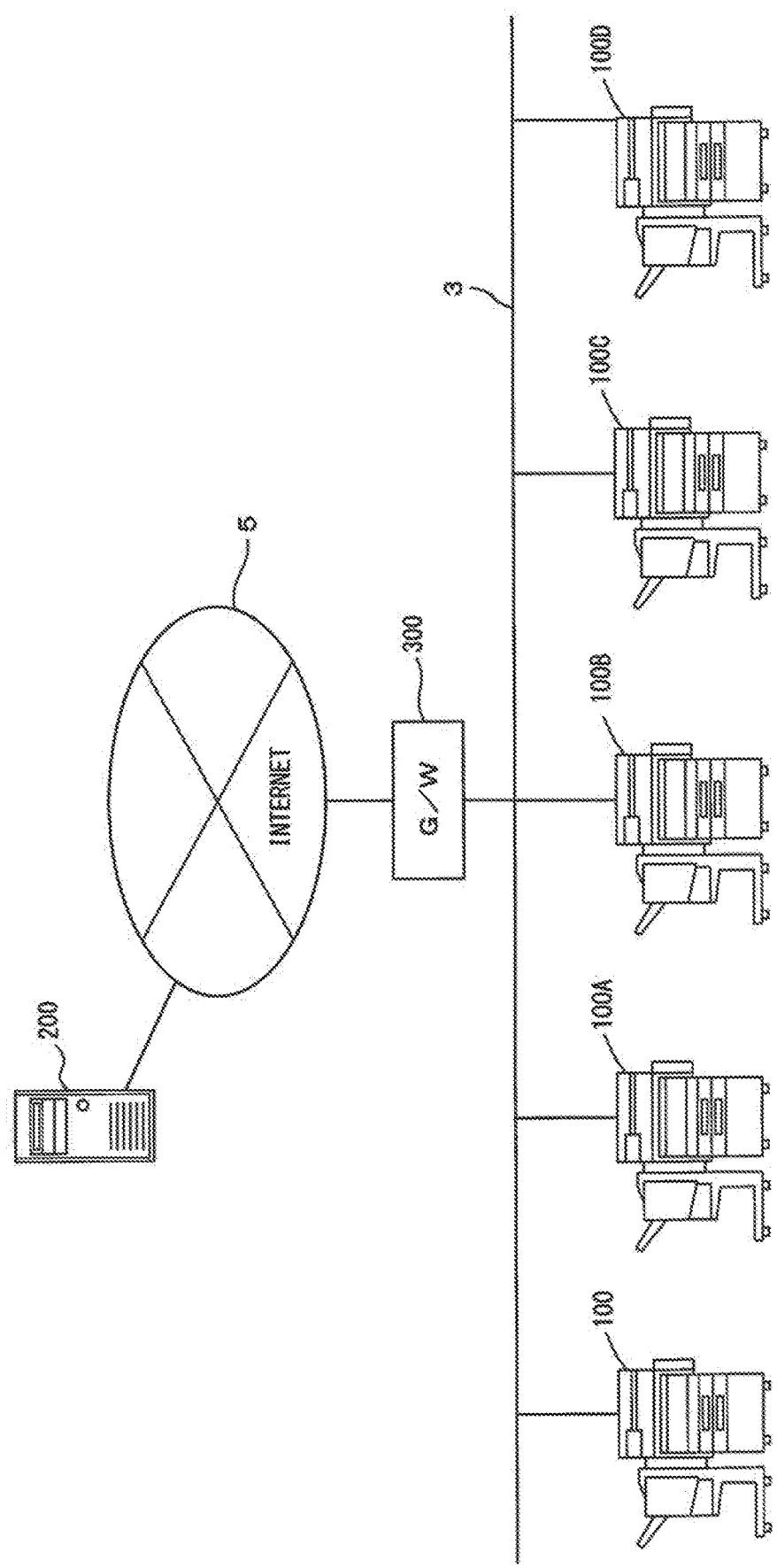

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing one example of an overview of an information processing system in one embodiment of the present invention. Referring to FIG. 1, the information processing system 1 includes a server 200 and MFPs (Multi Function Peripherals) 100, 100A to 100D. The server 200 is connected to the Internet 5, and each of the MFPs 100, 100A to 100D is connected to a Local Area Network (LAN) 3. The Internet 5 and the LAN 3 are connected to each other via a gateway (G/W) device 300. Therefore, the MFPs 100, 100A to 100D can communicate with one another via the LAN 3. Further, the server 200 can communicate with each of the MFPs 100, 100A to 100D via the Internet 5 and the LAN 3.

The basic hardware configuration and functions of each of the MFPs 100, 100A to 100D are the same. Thus, the MFP 100 will be described here as an example unless otherwise specified.

Figure 3:
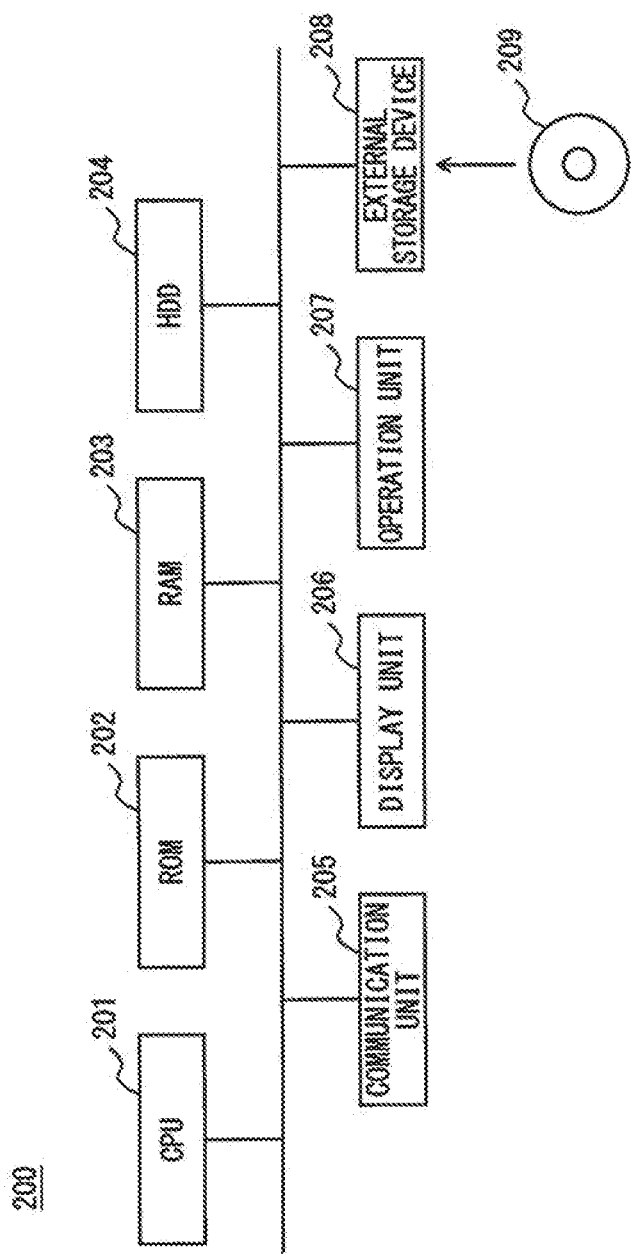
FIG. 3 is a block diagram showing one example of an outline of a hardware configuration of a server.

FIG. 3 is a block diagram showing one example of an outline of a hardware configuration of the server in the present embodiment. Referring to FIG. 3, the server 200 includes a Central Processing Unit (CPU) 201 for controlling the entire server 200, a ROM (Read Only Memory) 202 for storing a program executed by the CPU 201, a RAM 203 used as a work area of the CPU 201, a Hard Disc Drive (HDD) 204 for storing data in a non-volatile manner, a communication unit 205 for connecting the CPU 201 to the Internet 5, a display unit 206 for displaying information, an operation unit 207 for accepting input of operations by a user and an external storage device 208.

The ROM 202 stores a program executed by the CPU 201 or data necessary for execution of the program. The RAM 203 is used as a work area when the CPU 201 executes a program.

The display unit 206 is a display device such as a Liquid Crystal Display (LCD) and an organic ELD (Electro-Luminescence Display), and displays instruction menus to users, information about the acquired image data, and other information. The operation unit 207 includes a hard key unit including a plurality of keys and accepts input of a variety of instructions and data such as characters and numerals through the user's operations corresponding to the keys. The operation unit 207 may include a touch panel provided on the display unit 206.

The communication unit 205 is an interface for connecting the CPU 201 to the Internet 5. The CPU 201 communicates with a computer connected to the Internet 5 via the communication unit 205, and transmits and receives data. Further, the communication unit 205 can communicate with the MFPs 100, 100A to 100D connected to the LAN 3 via the gateway device 300.

The external storage device 208 is mounted with a CD-ROM 209. The CPU 201 is capable of accessing the CD-ROM 209 via the external storage device 208. The CPU 201 loads a program, recorded in the CD-ROM 209 which is mounted on the external storage device 208, into the RAM 203 for execution. It is noted that the medium for storing the program executed by the CPU 201 is not limited to CD-ROM 209. It may be an optical disc, an IC card, an optical card, and a semiconductor memory such as a mask ROM, an EPROM and an EEPROM.

Further, the program executed by the CPU 201 is not restricted to the program recorded in the CD-ROM 209, and the CPU 201 may load a program, stored in the HDD 204, into the RAM 203 for execution. In this case, another computer connected to the Internet 5 may rewrite the program stored in the HDD 204 of the server 200, or may additionally write a new program therein. Further, the server 200 may download a program from another computer connected to the Internet 5, and store the program in the HDD 204. The program referred to here includes not only a program directly executable by the CPU 201 but also a source program, a compressed program, an encrypted program or the like.

Figure 2:
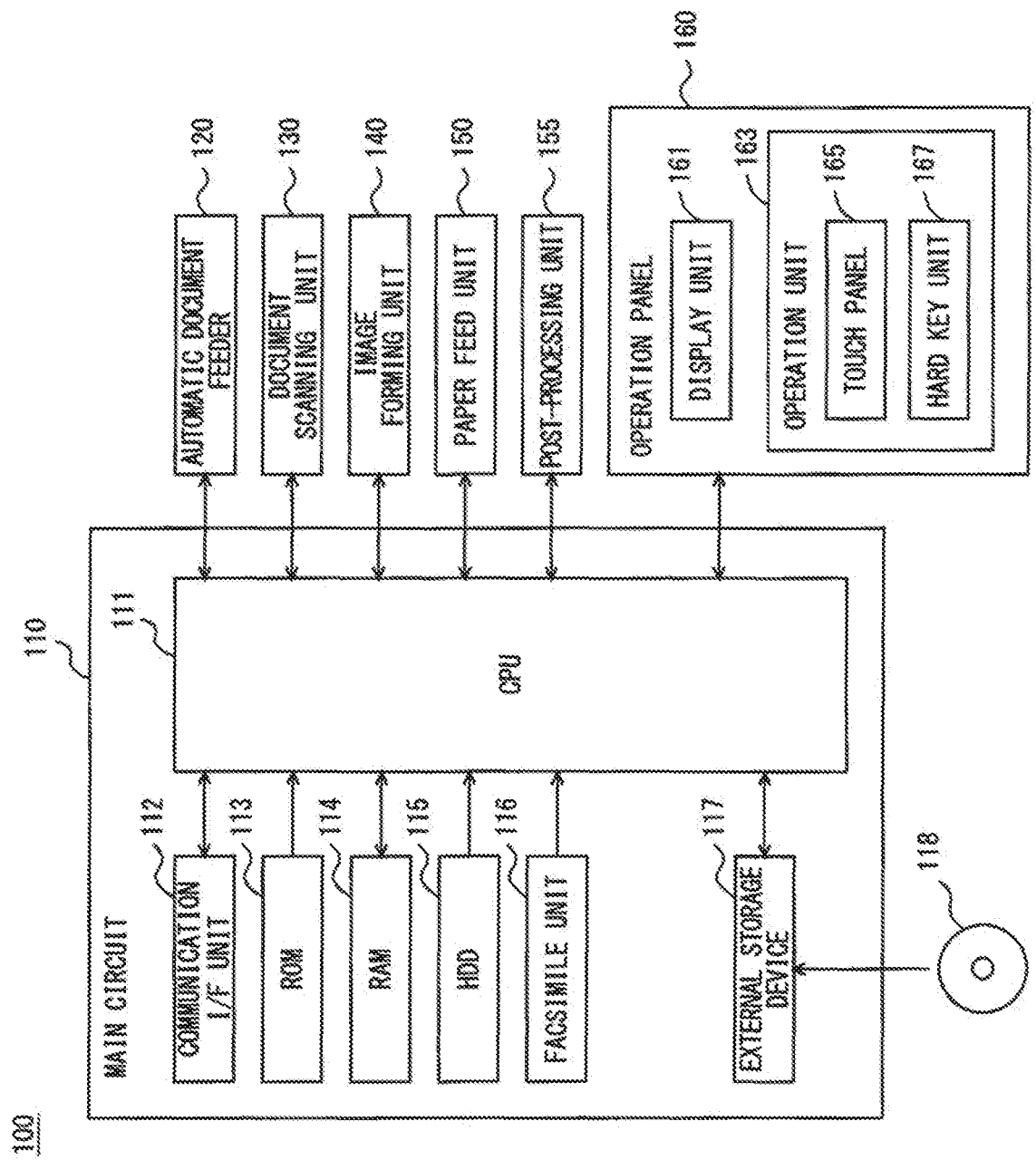
FIG. 2 is a block diagram showing one example of an outline of a hardware configuration of an MFP in the present embodiment.

FIG. 2 is a block diagram showing one example of an outline of the hardware configuration of the MFP. Referring to FIG. 2, the MFP 100 includes a main circuit 110, a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned a document, a paper feed unit 150 for supplying sheets of paper to the image forming unit 140, a post-processing unit 155 for processing sheets of paper on which images have been formed, and an operation panel 160 serving as a user interface.

The post-processing unit 155 performs a sorting process of sorting and discharging one or more sheets of paper on which images have been formed by the image forming unit 140, a punching process of punching the sheets, and a stapling process of stapling the sheets.

The main circuit 110 includes a CPU 111, a Communication Interface (I/F) unit 112, a ROM 113, a RAM 114, a Hard Disk Drive (HDD) 115 as a mass storage, a facsimile unit 116, and an external storage device 117 on which a CD-ROM 118 is mounted. The CPU 111 is connected to the automatic document feeder 120, the document scanning unit 130, the image forming unit 140, the paper feed unit 150, the post-processing unit 155, and the operation panel 160, and controls the entire MFP 100.

The ROM 113 stores a program executed by the CPU 111 or data necessary for execution of the program. The RAM 114 is used as a work area when the CPU 111 executes a program. Further, the RAM 114 temporarily stores scan data (image data) successively transmitted from the document scanning unit 130.

The operation panel 160 is provided on the upper surface of the MFP 100 and includes a display unit 161 and an operation unit 163. The display unit 161 is a display device such as a Liquid Crystal Display (LCD) or an organic ELD (Electro-Luminescence Display) and displays instruction menus to users, information about the acquired image data, and other information. The operation unit 163 includes a hard key unit 167 including a plurality of keys and accepts input of a variety of instructions and data such as characters and numerals through the user's operations corresponding to the keys. The operation unit 163 further includes a touch panel 165 provided on the display unit 161.

The communication I/F unit 112 is an interface for connecting the MFP 100 to the LAN 3. The CPU 111 communicates with a device connected to the LAN 3 via the communication I/F unit 112 for transmitting and receiving data. Further, the communication I/F unit 112 can communicate with a computer, for example, the server 200, which is connected to the Internet 5 via the gateway device 300.

The facsimile unit 116 is connected to the Public Switched Telephone Networks (PSTN) and transmits facsimile data to or receives facsimile data from the PSTN. The facsimile unit 116 stores the received facsimile data in the HDD 115 or outputs the data to the image forming unit 140. The image forming unit 140 prints the facsimile data received by the facsimile unit 116 on a sheet of paper. Further, the facsimile unit 116 converts the data stored in the HDD 115 into facsimile data, and transmits the facsimile data to a facsimile machine connected to the PSTN.

The external storage device 117 is mounted with the CD-ROM 118. The CPU 111 is capable of accessing the CD-ROM 118 via the external storage device 117. The CPU 111 loads a program, recorded in the CD-ROM 118 which is mounted on the external storage device 117, into the RAM 114 for execution. It is noted that the medium for storing the program executed by the CPU 111 is not limited to the CD-ROM 118. It may be an optical disc (MO/MD/DVD), an IC card, an optical card, and a semiconductor memory such as a mask ROM, an EPROM and an EEPROM.

Further, the CPU 111 may load a program, stored in the HDD 115, into the RAM 114 for execution. In this case, another computer connected to the LAN 3 or the Internet 5 may rewrite the program stored in the HDD 115 of the MFP 100, or may additionally write a new program therein. Further, the MFP 100 may download a program from another computer connected to the LAN 3 or the Internet 5, and store the program in the HDD 115. The program referred to here includes not only a program directly executable by the CPU 111 but also a source program, a compressed program, an encrypted program or the like.

In a data distribution system in the present embodiment, the MFPs 100, 100A to 100D are registered in the server 200 in advance as apparatuses to be managed. For example, the server 200 manages programs installed in each of the MFPs 100, 100A to 100D. The server 200 transmits a program to be installed or updated, and an install command for installing the program or an update command for updating the program, to each of the MFPs 100, 100A to 100D in order to allow each of the MFPs 100, 100A to 100D to install a new program or update a program with the program of a new version.

Further, the server 200 manages common data that is commonly stored in the MFPs 100, 100A to 100D, which are the apparatuses to be managed. The common data includes an address book, which is a list of information of addresses to which the data is transmitted, for example. In the case where new address information is added, or the existing address information is changed or deleted, the server 200 transmits data, including the address information and commands for giving instructions to add, change or delete the information, to each of the MFPs 100, 100A to 100D in order to update the address book stored in each of the MFPs 100, 100A to 100D.

Further, the common data includes setting values, which are set in each of the MFPs 100, 100A to 100D. While the setting values included in the common data are not restricted, the setting values include setting values for defining a protocol for transmitting and receiving data, setting values for defining a data format of the target data to be transmitted and received, and accounts and passwords for logging in service provision servers that provide predetermined services. In the case where a setting value included in the common data is changed, the server in the present embodiment transmits data, including a new setting value, and a command for giving an instruction to change the setting value, to each of the MFPs 100, 100A to 100D in order to allow each of the MFPs 100, 100A to 100D to change the setting value.

In the data distribution system in the present embodiment, an apparatus connected to the LAN to which the MFPs 100, 100A to 100D are connected, for example, any one of the MFPs 100, 100A to 100D, is requested to execute a process of transmitting data from the server 200 to the MFPs 100, 100A to 100D. Hereinafter, a process of transmitting data from the server 200 to the MFPs 100, 100A to 100D is referred to as a "distribution process", and the data that is to be transmitted is referred to as "target data".

Figure 4:
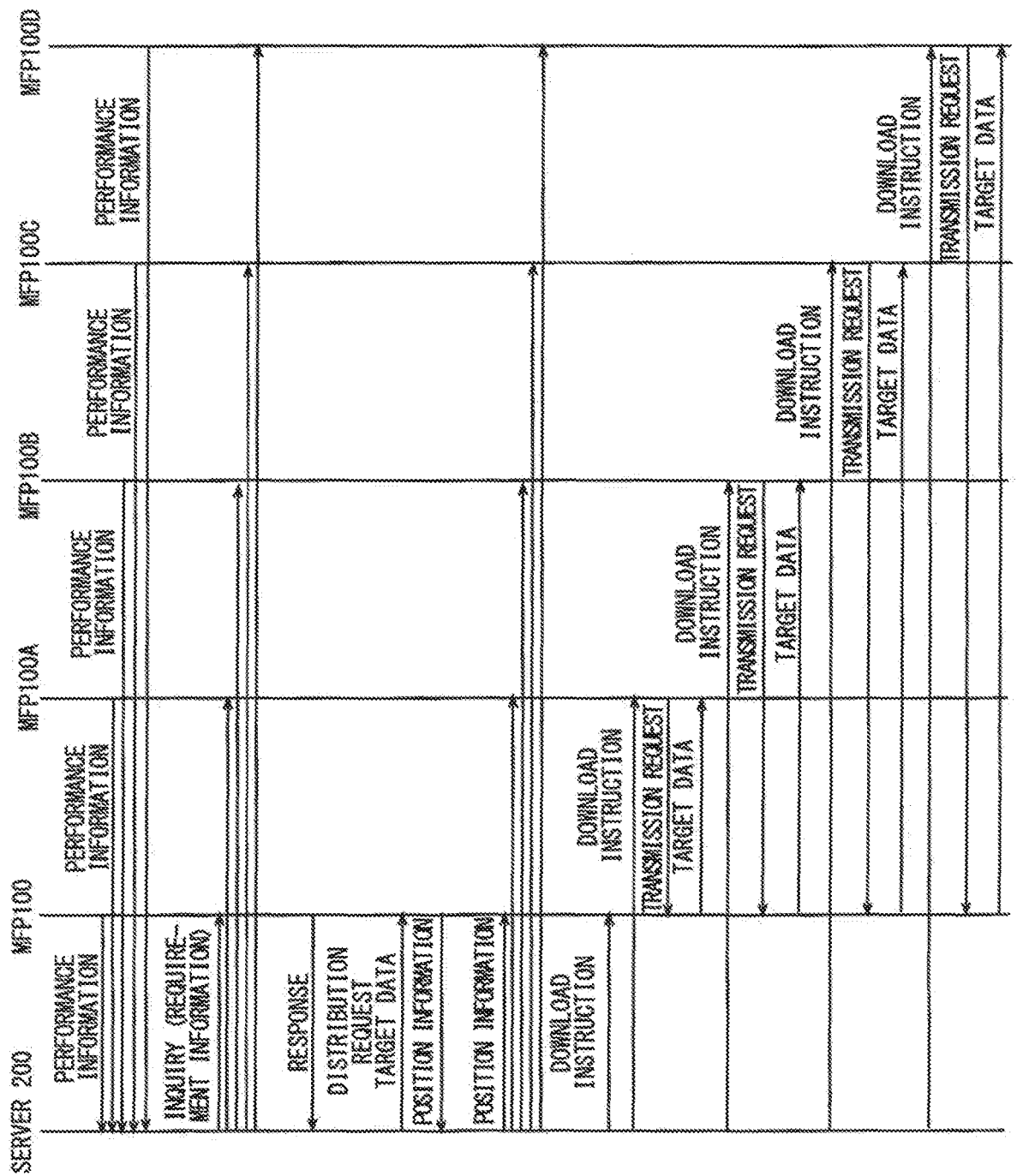
FIG. 4 is a diagram showing an outline of a flow of data in a distribution system.

FIG. 4 is a diagram showing an outline of a flow of the data in the distribution system. In FIG. 4, straight lines indicate the elapse of time with the time elapsing in a direction from above towards below. The straight lines indicate the time of the transmission and reception of the data by each of the server 200, the MFPs 100, 100A to 100D. The target data to be transmitted and received is indicated by arrows, and the arrows indicate which data transmitting apparatuses to which data receiving apparatuses the data is transmitted.

The server 200 requests the MFPs 100, 100A to 100D to transmit performance information, and receives the performance information from each of the MFPs 100, 100A to 100D. Each of the MFPs 100, 100A to 100D may transmit the performance information to the server 200 without receiving the request from the server 200. Further, the order of transmission of the performance information by the MFPs 100, 100A to 100D is not limited to the order shown in the diagram.

The server 200 determines candidate apparatuses based on the performance information of each of the MFPs 100, 100A to 100D, and inquires of the candidate apparatuses about whether the candidate apparatuses can execute the distribution process. The inquiry includes requirement information indicating requirements for transmitting the target data. Here, the case where it is determined that all of the MFPs 100, 100A to 100D are the candidate apparatuses is shown. Therefore, the server 200 inquires of each of the MFPs 100, 100A to 100D. The requirement information includes a lower limit value of an amount of additionally storable data in the HDD 115, a lower limit value of an unused region of the RAM 114, and a lower limit value of a proportion of idle-time of the CPU per unit time. Therefore, the requirement information differs depending on a size of the target data.

The MFPs 100, 100A to 100D, which are the candidate apparatuses and receive the inquiry, respectively respond in the case where their conditions meet the requirements defined by the requirement information. However, in the case where their conditions do not meet the requirements, the MFPs 100, 100A to 100D do not respond. Here, the case where the MFP 100 responds, and the MFPs 100A to 100D do not respond is described.

The server 200 determines that the MFP 100, which has responded to the inquiry, is a proxy apparatus, and requests the MFP 100 to execute the distribution process. When requesting the execution of the distribution process, the server 200 transmits the target data. The MFP 100, which is the proxy apparatus, stores the target data received from the server 200 in the HDD 115, and transmits a network address of the target data stored in the HDD 115 to the server 200 as position information. The network address is a URL (Uniform Resource Locator), for example.

The server 200 transmits the position information to transmission destination apparatuses, which are the apparatuses to which the target data is transmitted. Here, the transmission destination apparatuses are the MFPs 100, 100A to 100D. The MFPs 100, 100A to 100D temporarily store the position information transmitted by the server 200.

The server 200 transmits download instructions to the transmission destination apparatuses. In the case where the MFP 100, which is the transmission destination apparatus, receives the download instruction, because the target data, specified by the position information temporarily stored earlier, is stored in the MFP 100, the MFP 100 reads out the target data from the HDD 115, and stores the target data in a predetermined position of the HDD 115. When receiving the download instruction from the server 200, each of the MFPs 100A to 100D, which are the transmission destination apparatuses, transmits a transmission request including the position information temporarily stored earlier, to the MFP 100, downloads the target data specified by the position information from the MFP 100, and stores the target data in a predetermined position of the HDD 115.

In the case where the target data includes a command, each of the MFPs 100, 100A to 100D processes the target data in accordance with the command. For example, in the case where the target data includes a command for instructing installation and a program, each of the MFPs 100, 100A to 100D installs the program. In the case where the target data includes a command for updating common data and the common data, each of the MFPs 100, 100A to 100D executes the command and updates the common data. In the case where the common data is address information, the address book is updated. In the case where the common data is a setting value, the setting value is updated.

Figure 5:
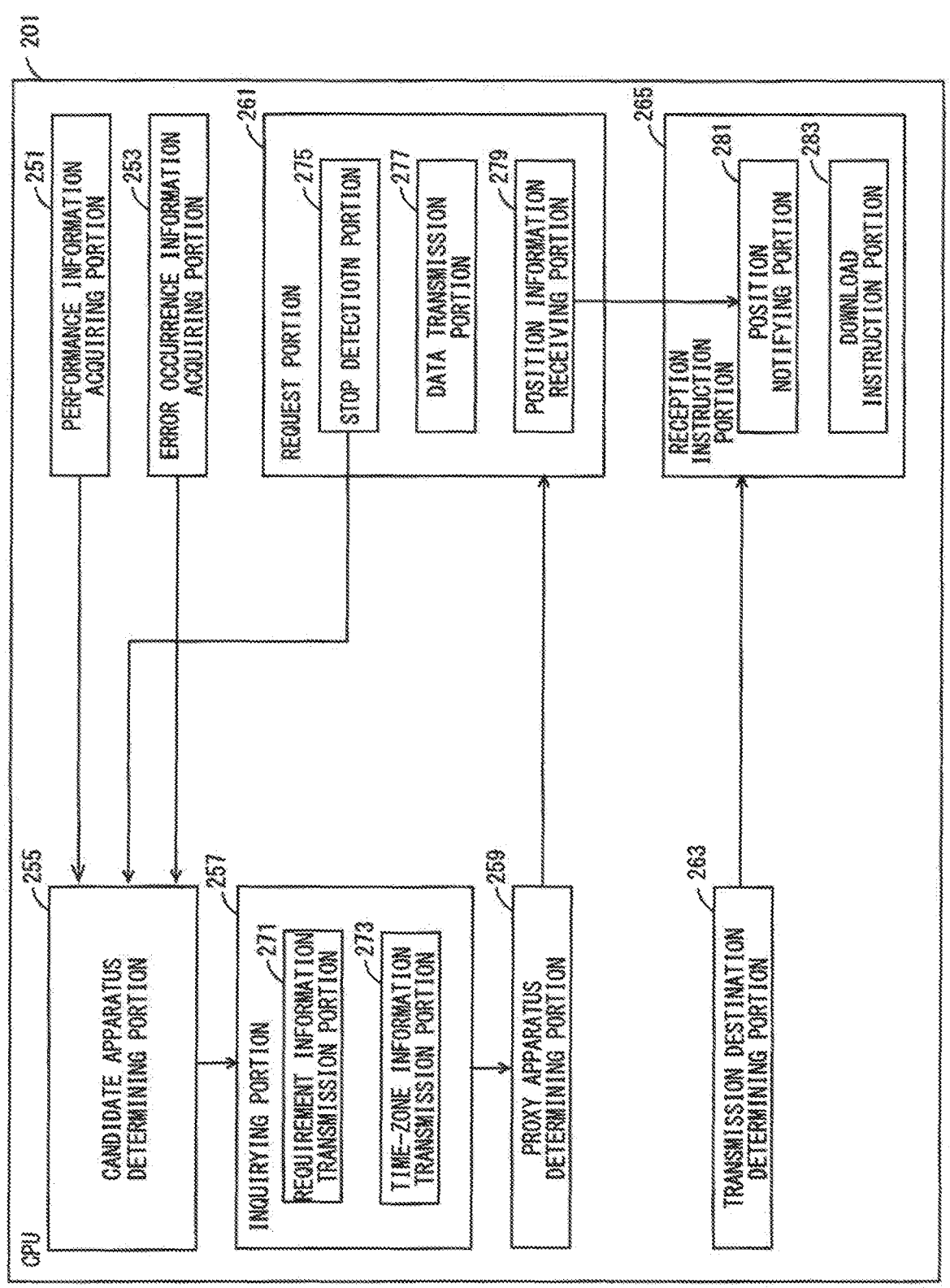
FIG. 5 is a block diagram showing one example of functions of a CPU included in the server.

FIG. 5 is a block diagram showing one example of functions of a CPU included in the server. The functions shown in FIG. 5 are formed in the CPU 201 in the case where the CPU 201 included in the server 200 executes a data distribution program stored in the ROM 202, the HDD 204 or the CD-ROM 209. Referring to FIG. 5, the CPU 201 included in the server 200 includes a performance information acquiring portion 251, an error occurrence information acquiring portion 253, a candidate apparatus determining portion 255, an inquiring portion 257, a proxy apparatus determining portion 259, a request portion 261, a transmission destination determining portion 263 and a reception instruction portion 265.

The performance information acquiring portion 251 acquires the performance information from each of the MFPs 100, 100A to 100D, which are registered as the apparatuses to be managed. Specifically, the performance information acquiring portion 251 controls the communication unit 205, requests each of the MFPs 100, 100A to 100D to transmit the performance information, and acquires the performance information, which the communication unit 205 receives from each of the MFPs 100, 100A to 100D. The performance information indicates the performance of the hardware resources of each of the MFPs 100, 100A to 100D. The performance information includes a processing speed of the CPU 111 and a size of the RAM 114, for example. In the case where acquiring the performance information of each of the MFPs 100, 100A to 100D, the performance information acquiring portion 251 outputs a set of apparatuses identification information and the performance information of the apparatuses, which has transmitted the performance information, to the candidate apparatus determining portion 255.

The error occurrence information acquiring portion 253 acquires error occurrence information from each of the MFPs 100, 100A to 100D, which are registered as the apparatuses to be managed. Specifically, the error occurrence information acquiring portion 253 controls the communication unit 205, requests the MFPs 100, 100A to 100D to transmit the error occurrence information, and acquires the error occurrence information, which the communication unit 205 receives from each of the MFPs 100, 100A to 100D. In the case where receiving a request for transmitting the error occurrence information, each of the MFPs 100, 100A to 100D returns the error occurrence information including error identification information for identifying an error occurring at that time point. In the case where acquiring the error occurrence information, the error occurrence information acquiring portion 253 outputs a set of, the apparatuses identification information of the apparatus, which has transmitted the error occurrence information, and the error occurrence information, to the candidate apparatus determining portion 255.

The candidate apparatus determining portion 255 determines the candidate apparatuses from among the MFPs 100, 100A to 100D, which are registered as the apparatuses to be managed. As for each of the MFPs 100, 100A to 100D, the candidate apparatus determining portion 255 compares the performance information with the hardware resource requirements required for execution of the distribution process. In the case where the performance of the apparatus meets the hardware resource requirements, the candidate apparatus determining portion 255 determines that the apparatus is the candidate apparatus. The hardware resource requirements define lower limit values of the performance of the hardware resources. For example, the hardware resource requirements are a lower limit value of the processing speed of the CPU and a lower limit value of the size of the memory used as a work area by the CPU. The hardware resource requirements preferably differ depending on a size of the target data. Therefore, the candidate apparatus determining portion 255 defines the hardware resource requirements according to a size of the target data. A table defining the hardware resource requirements may be prepared for each of a plurality of sizes of the data, and the hardware resource requirements may be determined with reference to the table. The candidate apparatus determining portion 255 compares the performance information with the hardware resource requirements for each of the MFPs 100, 100A to 100D. If the processing speed of the CPU 111 and the size of the RAM 114 included in the performance information are equal to or greater than lower limit values respectively defined by the hardware resource requirements, the candidate apparatus determining portion 255 determines that the apparatus is the candidate apparatus. In the case where determining the candidate apparatus, the candidate apparatus determining portion 255 outputs the apparatus identification information for identifying the candidate apparatus to the inquiring portion 257.

Further, even if the performance information of one of the MFPs 100, 100A to 100D meets the hardware resource requirements, the candidate apparatus determining portion 255 does not determine that the apparatus in which an unrecoverable error is present is the candidate apparatus. This is because it is highly likely that the apparatus in which the unrecoverable error is present cannot execute the distribution process. The error includes a software error caused by an operation of the software, and a hardware error caused by an operation of the hardware resources. In the case where the unrecoverable error is the software error, a continuous operation cannot be performed due to a problem with an operating system. For example, the error includes the case where the data cannot be continuously transmitted and received via the LAN 3. In the case where the unrecoverable error is the hardware error, it is difficult for a user to resolve the error. For example, it includes an error that requires the replacement of the hardware resource to be resolved. Specifically, it includes sensor failure, a problem with the power supply, failure of a photoreceptor drum, failure of a fixing roller and failure of a developer. This is because, in the case where the error is unrecoverable, the hardware resource sometimes cannot operate, and the main switch is sometimes switched OFF. The unrecoverable errors are not limited to these. The unrecoverable errors may be determined by an administrator of the server 200. For example, a table defining the unrecoverable errors may be prepared in advance, and the candidate apparatus determining portion 255 determines whether the error specified by the error identification information received from the apparatus is unrecoverable with reference to the table.

The candidate apparatus determining portion 255 sometimes determines that the apparatus in which an recoverable error is present among the MFPs 100, 100A to 100D is the candidate apparatus. This is because, in the apparatus in which the recoverable error is present, the apparatus is likely to recover from the recoverable error by the time of the execution of the distribution process. In the case where the recoverable error is a software error, the error is caused by a mistake in setting by the user, for example. In the case where the recoverable error is a hardware error, the error is caused by a paper jam, an operable life of consumables, and an opened cover of the body of the apparatus, for example.

In the following description, the case where it is determined that all of the MFPs 100, 100A to 100D are the candidate apparatuses will be described as an example. The inquiring portion 257 inquires of the candidate apparatus about whether the distribution process can be executed. Specifically, the inquiring portion 257 controls the communication unit 205, and transmits a signal for inquiring whether the distribution process can be executed to each of the MFPs 100, 100A to 100D, which are the candidate apparatuses. The inquiring portion 257 outputs the apparatus identification information of each of the MFPs 100, 100A to 100D, which are the candidate apparatuses that have received the inquiries, to the candidate apparatus determining portion 259.

The inquiring portion 257 includes a requirement information transmission portion 271 and a time-zone information transmission portion 273. The requirement information transmission portion 271 controls the communication unit 205, and transmits the requirement information to each of the MFPs 100, 100A to 100D, which are the candidate apparatuses. The requirement information indicates a load required to execute the distribution process. The requirement information includes a lower limit value of an amount of fixedly storable data, a lower limit value of an empty space of the memory used as a work area by the CPU and a lower limit value of a proportion of the idle-time of the CPU per unit time. The lower limit value of the amount of fixedly storable-data is the same as the size of the target data. Here, the lower limit value of the empty space of the memory used as the work area by the CPU is the lower limit value of the empty space of the memory per unit time. The lower limit value of the proportion of the idle-time of the CPU per unit time is a proportion of a time period during which the job is not executed per unit time. The requirement information is defined by the size of the target data. Therefore, a table defining the requirement information corresponding to each of the plurality of sizes of data is prepared, and the inquiring portion 257 determines the requirement information corresponding to the size of the target data.

The time-zone information transmission portion 273 controls the communication unit 205, and transmits the time-zone information to each of the MFPs 100, 100A to 100D, which are the candidate apparatuses. The time-zone information indicates the distribution time-zone, which is defined by the user as a period during which the target data is distributed, and includes start date and time and end date and time.

The proxy apparatus determining portion 259 controls the communication unit 205, and receives a response from any one of the MFPs 100, 100A to 100D, which are the candidate apparatuses. Details of the candidate apparatuses that receive the inquiries will be described below. However, the candidate apparatus returns a response signal in the case where the distribution process can be executed, and does not return a response signal in the case where the distribution process cannot be executed. In the case where receiving a response signal from at least one candidate apparatus within a predetermined time period from the time when the inquiring portion 257 inquires of the one or more candidate apparatuses, the candidate apparatus determining portion 259 determines that any one of one or more candidate apparatuses that have transmitted the response signals is the candidate apparatus. Specifically, in the case where the communication unit 205 receives the response signal from the candidate apparatus specified by the apparatus identification information within the predetermined time period from the time when the apparatus identification information is input by the inquiring portion 257, the candidate apparatus determining portion 259 determines that the apparatus is the candidate apparatus. The proxy apparatus determining portion 259 outputs the apparatus identification information of the apparatus, which is selected as the proxy apparatus, to the request portion 261.

In the case where receiving response signals from a plurality of candidate apparatuses, the proxy apparatus determining portion 259 determines that one of the plurality of candidate apparatuses that have transmitted response signals is a proxy apparatus. It may be determined that any one of the plurality of candidate apparatuses is the proxy apparatus. Alternatively, it may be determined that the candidate apparatus that includes the hardware resources having the best performance is the proxy apparatus. In the case where not receiving a response signal from any of the one or more candidate apparatuses of which the inquiring portion 257 has inquired, the proxy apparatus determining portion 259 does not determine the proxy apparatus. In this case, the proxy apparatus determining portion 259 processes it as an error. For example, an error message indicating that the proxy apparatus cannot be determined is displayed in the display unit 206.

The request portion 261 receives the apparatus identification information of the proxy apparatus from the proxy apparatus determining portion 259. The request portion 261 requests the proxy apparatus to execute the distribution process of the target data. The request portion 261 includes a stop detection portion 275, a data transmission portion 277 and a position information receiving portion 279. In the following description, the case where the proxy apparatus determining portion 259 determines that the MFP 100 is the proxy apparatus will be described as an example.

The data transmission portion 277 controls the communication unit 205 and transmits the target data to the MFP 100, which is the proxy apparatus. While details of the MFP 100, which is the proxy apparatus, will be described below, the proxy apparatus returns the position information indicating the network address of the target data in response to reception of the target data. Further, the proxy apparatus transmits a stop signal to the server 200 when being no longer able to continue executing the distribution process of the target data.

The position information receiving portion 279 controls the communication unit 205, and receives the position information from the MFP 100, which is the proxy apparatus. The position information receiving portion 279 outputs the position information to the reception instruction portion 265.

In the case where controlling the communication unit 205 and receiving the stop signal from the MFP 100, which is the proxy apparatus, the stop detection portion 275 outputs a redetermination instruction to the candidate apparatus determining portion 255. While details of the operation of the CPU 201 in the case where the CPU 201 receives the stop signal from the MFP 100, which is the proxy apparatus, will be described below, the CPU 201 determines that another apparatus, which is not the MFP 100 that has transmitted the stop signal, is a new proxy apparatus, and allows the new proxy apparatus to execute the distribution process of the target data, and allows the transmission destination apparatuses to download the target data from the new proxy apparatus.

The transmission destination determining portion 263 determines the transmission destination apparatuses to which the target data is transmitted. The case where it is determined that the MFPs 100, 100A to 100D are the transmission destination apparatuses is described here as an example. The transmission destination determining portion 263 determines that all of the MFPs 100, 100A to 100D, which are the apparatuses to be managed by the server 200, are the transmission destination apparatuses. The user may determine the transmission destination apparatuses, or the transmission destination apparatuses may be determined for each type of the target data. For example, in the case where the target data includes an update program, it is determined that an apparatus that requires the update of the program is the transmission destination apparatus. Further, in the case where the target data includes a new password for logging in a service provision server, it is determined that an apparatus that stores an account and a password for logging in the service provision server is the transmission destination apparatus. The transmission destination determining portion 263 outputs the apparatus identification information of the transmission destination apparatus to the reception instruction portion 265.

The reception instruction portion 265 includes a position notifying portion 281 and a download instruction portion 283. The position notifying portion 281 controls the communication unit 205, and transmits the position information received from the position information receiving portion 279 to the transmission destination apparatus. In the case where there are a plurality of transmission destination apparatuses, the position information is transmitted to all of the plurality of transmission destination apparatuses. The position information is transmitted to each of the MFPs 100, 100A to 100D in this case. While the details of the transmission destination apparatus that receives the position information will be described below, the position information is temporarily stored in the HDD 115. The transmission destination apparatus downloads the target data specified by the position information in response to reception of the download instruction.

When a current time point is in the distribution time-zone defined for distribution of the target data, the download instruction portion 283 controls the communication unit 205 and transmits the download instruction to the transmission destination apparatus. In the case where there are a plurality of transmission destination apparatuses, the download instruction is transmitted to all of the plurality of transmission destination apparatuses. The download instruction is transmitted to each of the MFPs 100, 100A to 100D in this case. Thus, the transmission destination apparatuses download the target data from the proxy apparatus, so that the server 200 can synchronize the time points at which the plurality of transmission destination apparatuses download the target data. Further, the download instructions may be sequentially transmitted to the plurality of transmission destination apparatuses at predetermined time intervals. Thus, it is not necessary for the proxy apparatus to simultaneously transmit the target data to the plurality of transmission destination apparatuses, so that a load on the proxy apparatus is not temporarily increased and can be leveled. Further, if the download instructions are transmitted to the plurality of transmission destination apparatuses at predetermined time intervals, an amount of data being transmitted through the LAN 3 is not temporarily increased, and packet collision can be reduced. Thus, the data can be efficiently transmitted. This is effective in the case where the size of the target data is large.

Figure 6:
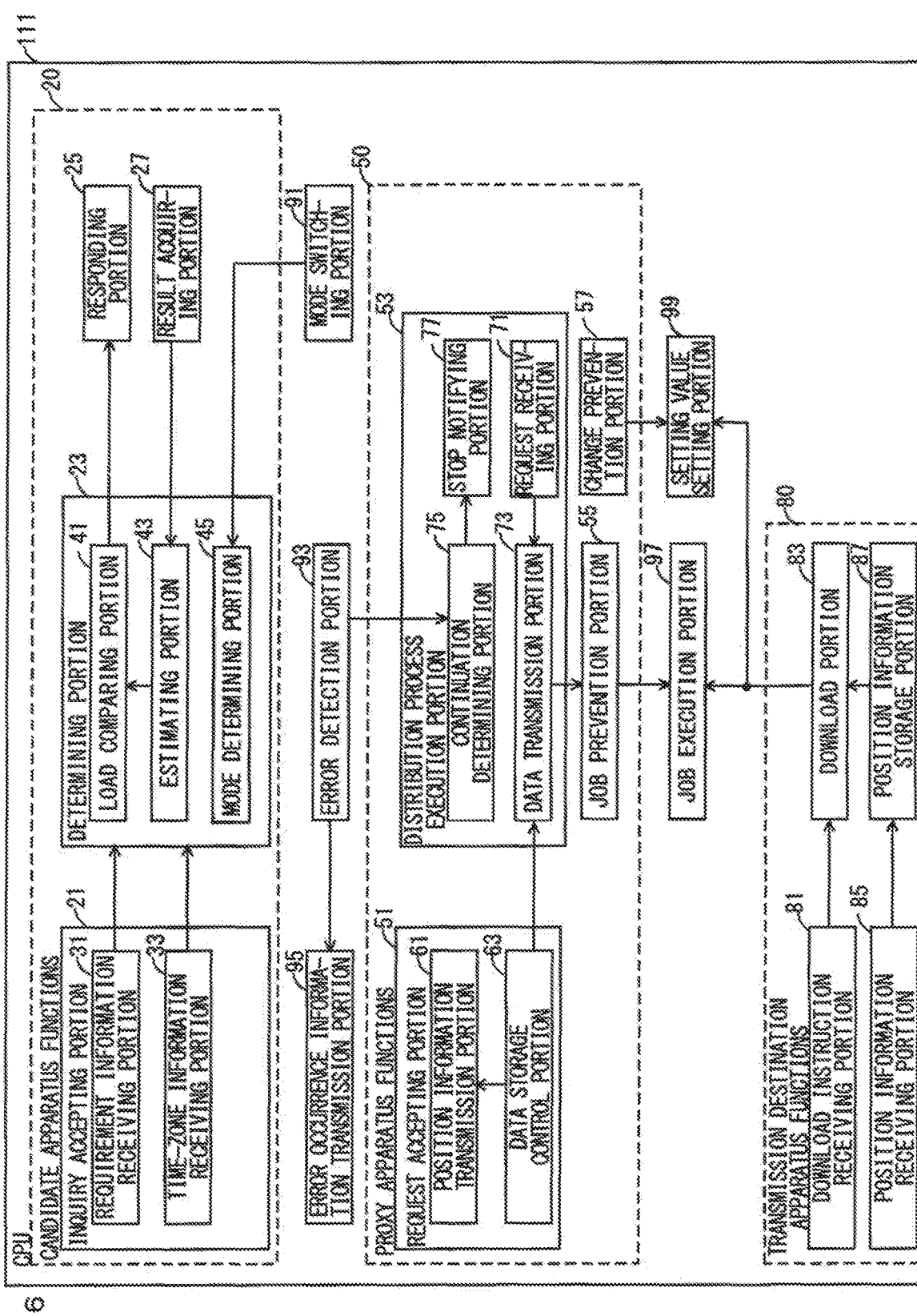
FIG. 6 is a block diagram showing one example of functions of a CPU included in the MFP in the present embodiment.

FIG. 6 is a block diagram showing one example of functions of the CPU included in the MFP in the present embodiment. The functions shown in FIG. 6 are formed in the CPU 111 in the case where the CPU 111 included in the MFP 100 executes a proxy distribution program and a download program stored in the ROM 113, the HDD 115 or the CD-ROM 118. The proxy distribution program and the download program are part of the data distribution program. Referring to FIG. 6, the CPU 111 includes candidate apparatus functions 20, proxy apparatus functions 50, transmission destination apparatus functions 80, a mode switching portion 91, an error detection portion 93, an error occurrence information transmission portion 95, a job execution portion 97 and a setting value setting portion 99.

The mode switching portion 91 switches the operation mode of the MFP 100 to any one of a normal mode, and a power saving mode in which power consumption is lower than that in the normal mode, and outputs the operation mode. The mode switching portion 91 switches the operation modes in accordance with a predetermined schedule. The schedule defines a power saving mode period and a normal mode period. For example, in the case where the schedule is defined that the power saving mode is assigned to a predetermined night period, and the normal mode is assigned to a period other than the night period, the mode switching portion 91 switches the operation mode to the power saving mode during the night period, and switches the operation mode to the normal period during the period other than the night period. Further, during the period other than the night period, the mode switching portion 91 switches the operation mode to the power saving mode if a power saving transition condition is satisfied during the normal mode. If a restoration condition is satisfied during the power saving mode, the mode switching portion 91 switches the operation mode to the normal mode. While not being limited, the power saving transition condition is satisfied in the case where a period, during which the operation panel 160 does not accept an operation by the user, and the communication I/F unit 112 does not receive a job, exceeds a predetermined time period. While not being limited, the restoration condition is satisfied in the case where the operation panel 160 accepts an operation by the user, or the case where the communication I/F unit 112 receives a job.

The error detection portion 93 detects an error that occurs in the MFP 100, and outputs error identification information for identifying the detected error to the error occurrence information transmission portion 95 and a continuation determining portion 75, described below.

The error occurrence information transmission portion 95 controls the communication I/F unit 112. In the case where the error identification information has been received from the error detection portion 93 by a time point at which a request is received from the server 200, the error occurrence information transmission portion 95 transmits the error identification information to the server 200.

The job execution portion 97 controls the hardware resources using setting values set for controlling the hardware resources and executes a job. The job is a process executable by the MFP 100. While not being limited, the job includes a print job for forming an image of data on a sheet of paper, a scan job for scanning a document, a copy job which is the combination of the scan job and the print job, and a data transmission reception job for transmitting and receiving data. The job execution portion 97 stores operation result information in the HDD 115 each time a job is executed. The operation result information includes the start date and time and the end date and time of the execution of the job.

The setting value setting portion 99 sets a setting value used in the case where the job execution portion 97 executes a job. The setting value setting portion 99 sets a setting value based on an operation of inputting in the operation unit 163 by the user.

The candidate apparatus functions 20 include an inquiry accepting portion 21, a determining portion 23, a responding portion 25 and a result acquiring portion 27. The inquiry accepting portion 21 controls the communication I/F unit 112, and receives a signal, inquiring about whether the distribution process of distributing the target data can be executed, from the server 200. The inquiry accepting portion 21 includes a requirement information receiving portion 31 and a time-zone information receiving portion 33. The requirement information receiving portion 31 controls the communication I/F unit 112, receives the requirement information from the server 200, and outputs the received requirement information to the determining portion 23. The time-zone information receiving portion 33 controls the communication OF unit 112, receives the time-zone information from the server 200, and outputs the received time-zone information to the determining portion 23.

The result acquiring portion 27 acquires the operation result information indicating the past operation status of the MFP 100. The operation result information is the information indicating the date and time when the job is executed for each job that has been executed in the past, and the information stored in the HDD 115 each time the job execution portion 97 executes the job. The result acquiring portion 27 reads out the operation result information from the HDD 115 and outputs the operation result information to the determining portion 23.

The determining portion 23 determines whether the distribution process can be executed. The determining portion 23 includes a load comparing portion 41, an estimating portion 43 and a mode determining portion 45. The estimating portion 43 receives the operation result information from the result acquiring portion 27. The estimating portion 43 estimates a margin in the distribution time-zone, defined by the time-zone information received from the time-zone information receiving portion 33, based on the operation result information. The margin corresponds to an idle condition of the CPU 111 that is executing a job. For example, a proportion of the time period during which the CPU 111 is not executing the job in the time-zone, corresponding to the past distribution time-zone, can be the margin. Specifically, the estimating portion 43 specifies a job, which is executed on a date different from but in the time-zone same as the distribution time-zone defined by the time-zone information, and calculates a proportion of a time period during which a job is not executed in the time-zone as a margin, which indicates the idle-time of the CPU 111. Further, the margin corresponds to the availability of the hardware resources. For example, an empty space of the RAM 114, which is the hardware resource, in the time-zone corresponding to the past distribution time-zone can be the margin. Specifically, the estimating portion 43 estimates the average size of the empty space of the RAM 114 on the date different from but in the time-zone same as the distribution time-zone defined by the time-zone information, as the margin indicating the empty space of the RAM 114. The estimating portion 43 outputs the margin indicating the idle-time of the CPU 111 and the margin indicating the empty space of the RAM 114 to the load comparing portion 41.

The load comparing portion 41 compares a load required to execute the distribution process, defined by the requirement information received from the requirement information receiving portion 31, to the margin. The requirement information includes a lower limit value of an amount of fixedly storable data, a lower limit value of an empty space of the memory used by the CPU as a work region, and a lower limit value of a proportion of the idle-time of the CPU per unit time. Specifically, if a proportion of the idle-time of the CPU 111 estimated by the estimating portion 43 is equal to or greater than the lower limit value of the idle-time of the CPU included in the requirement information, the load comparing portion 41 determines that the margin is equal to or greater than the load. If the proportion of the idle-time of the CPU 111 estimated by the estimating portion 43 is smaller than the lower limit value of the proportion of the idle-time of the CPU per unit time included in the requirement information, the load comparing portion 41 determines that the margin is smaller than the load. Further, if the estimated empty space of the RAM 114 is equal to or greater than the lower limit value of the empty space of the memory included in the requirement information, the load comparing portion 41 determines that the margin is equal to or greater than the load. If the estimated empty space of the RAM 114 is smaller than the lower limit value of the empty space of the memory included in the requirement information, the load comparing portion 41 determines that the margin is smaller than the load. Further, if the empty space in which the data can be stored in the HDD 115 is equal to or greater than the lower limit value of the amount of fixedly storable data included in the requirement information, the load comparing portion 41 determines that the margin is equal to or greater than the load. If the empty space in which the data can be stored in the HDD 115 is smaller than the lower limit value of the amount of fixedly storable data included in the requirement information, the load comparing portion 41 determines that the margin is smaller than the load.

With reference to the schedule set by the mode switching portion 91, the mode determining portion 45 determines an operation mode in the distribution time-zone indicated by the time-zone information received from the time-zone information receiving portion 33.

In the case where it is not determined by the load comparing portion 41 that the margin is smaller than the load, and the operation mode determined by the mode determining portion 45 is the normal mode, the determining portion 23 determines that the distribution process can be executed. In the case where it is determined by the load comparing portion 41 that the margin is smaller than the load, or the case where the operation mode determined by the mode determining portion 45 is the power saving mode, the determining portion 23 determines that the distribution process cannot be executed. In the case where determining that the distribution process can be executed, the determining portion 23 outputs a response instruction to the responding portion 25. The responding portion 25 controls the communication I/F unit 112, and transmits a response signal, indicating that the distribution process can be executed, to the server 200.

The proxy apparatus functions 50 include a request accepting portion 51, a distribution process execution portion 53, a job prevention portion 55 and a change prevention portion 57. The request accepting portion 51 accepts a request of execution of the distribution process from the server 200. The request accepting portion 51 includes a position information transmission portion 61 and a data storage control portion 63. The data storage control portion 63 controls the communication I/F unit 112, receives the target data transmitted by the server 200 and stores the received target data in the HDD 115. The data storage control portion 63 stores the target data in a region, which is open to access by another computer. While protocols for providing shared access to the data are not limited, an SMB (Server Message Block), a CIFS (Common Internet File System), a WebDAV (Distributed Authoring and Versioning protocol for the WWW) and the like can be used. The data storage control portion 63 outputs a name of a file of the target data to the position information transmission portion 61 and the distribution process execution portion 53.

The position information transmission portion 61 generates the network address of the target data as position information using the name of the file received from the data storage control portion 63. The position information transmission portion 61 controls the communication I/F unit 112 and transmits the position information to the server 200.

In response to the externally received download request, the distribution process execution portion 53 transmits the target data specified by the name of the file received from the data storage control portion 63. The server 200 transmits download instructions to the MFPs 100, 100A to 100D, so that the MFPs 100A to 100D transmit download requests. The distribution process execution portion 53 includes a continuation determining portion 75, a stop notifying portion 77, a request receiving portion 71 and a data transmission portion 73.

The request receiving portion 71 controls the communication I/F unit 112 and receives the download request transmitted by any one of the MFPs 100A to 100D. The download request includes the position information transmitted by the position information transmission portion 61. When receiving the download request, the request receiving portion 71 outputs the position information included in the download request and the apparatus identification information of the apparatus, which has transmitted the download request, to the data transmission portion 73.

In response to receiving the position information and the apparatus identification information from the request receiving portion 71, the data transmission portion 73 reads out the target data specified by the position information from the HDD 115, controls the communication I/F unit 112 and transmits the read target data to the apparatus specified by the apparatus identification information. Therefore, in the case where the MFPs 100A to 100D transmit the download requests, the target data is transmitted to each of the MFPs 100A to 100D.

In response to receiving the error identification information from the error detection portion 93 in the distribution time-zone indicated by the time-zone information, the continuation determining portion 75 determines whether the execution of the distribution process continues. In the case where the error specified by the error identification information is unrecoverable, the continuation determining portion 75 outputs a stop instruction to the stop notifying portion 77. This is because, in the case where an unrecoverable error is present, the power of the MFP 100 is sometimes switched OFF, and the distribution process cannot be executed in that case. A table defining unrecoverable errors may be prepared in advance. This is also because, in the case where the occurring unrecoverable error is an error relating to the data communication, the target data cannot be transmitted.

In the case where the error specified by the error identification information is recoverable, when the apparatus has not recovered from the error even if a grace time period determined in advance for the error has elapsed since the occurrence of the error, the continuation determining portion 75 outputs a stop instruction to the stop notifying portion 77. The grace time period is a time period that is determined in advance as a time period required for the apparatus to recover from an error. This is because, in the case where the apparatus does not recover from the recoverable error, the power of the MFP 100 is sometimes switched OFF, and the distribution process cannot be executed in that case.

FIG. 7 is a diagram showing one example of a first error table defining unrecoverable errors. Referring to FIG. 7, errors that are caused by a problem with the CPU, a problem with a transfer belt and a problem with a fixing device are defined as the unrecoverable errors.

FIG. 8 is a diagram showing one example of a second error table defining recoverable errors. Referring to FIG. 8, a grace time period of 60 seconds is defined for an error that has occurred because the apparatus cannot communicate with the server 200, a grace time period of 200 seconds is defined for an error that has occurred because of a packet loss, a grace time period of 15 seconds is defined for an error that has occurred because of a problem with the protocol, a grace time period of 10 seconds is defined for an error that has occurred because of a connection loop problem, and a grace time period of 300 seconds is defined for an error that has occurred because of a problem with transmission as the recoverable errors.

Returning to FIG. 6, in response to receiving the stop instruction from the continuation determining portion 75, the stop notifying portion 77 controls the communication I/F unit 112 and transmits a stop signal to the server 200. As described above, when receiving the stop signal from the MFP 100, which is the proxy apparatus, the server 200 determines a new proxy apparatus from among the MFPs 100A to 100D excluding the MFP 100, and requests the new proxy apparatus to execute the distribution process. Therefore, when the distribution process can be executed in the new proxy apparatus, a download request, which is transmitted afterwards, includes the position information of the target data stored in the new proxy apparatus. Therefore, the MFP 100 no longer receives the download request.

During a period in which the data transmission portion 73 is transmitting the target data, the job prevention portion 55 stops the execution of the job by the job execution portion 97. When the job execution portion 97 executes the job, a margin of the CPU 111 is reduced, and a work area of the RAM 114 is reduced. Thus, the data transmission portion 73 sometimes cannot transmit the target data.

During a period from the time when the request accepting portion 51 accepts the request of the execution of the distribution process until the time when a current time point passes the distribution time-zone during which the distribution process is executed, when the setting value setting portion 99 changes a setting value, a process of transmitting the target data sometimes cannot be executed. In that case, the change prevention portion 57 prevents the setting value from being changed by the setting value setting portion 99. This is because the change of the setting value disables the transmission of the target data by the data transmission portion 73, and disables the execution of the distribution process.

The transmission destination apparatus functions 80 will be described as functions of the MFP 100A. The transmission destination apparatus functions 80 include a download instruction receiving portion 81, a download portion 83, a position information receiving portion 85 and a position information storage portion 87. The position information receiving portion 85 controls the communication I/F unit 112, receives the position information transmitted by the server 200, and outputs the received position information to the position information storage portion 87. The position information storage portion 87 stores the position information received from the position information receiving portion 85 in the HDD 115.

The download instruction receiving portion 81 controls the communication I/F unit 112, and receives a download instruction transmitted by the server 200. In response to receiving the download instruction, the download instruction receiving portion 81 outputs the download instruction to the download portion 83. In response to receiving the download instruction, the download portion 83 reads out the position information stored by the position information storage portion 87, and downloads the target data specified by the position information. Specifically, the download portion 83 controls the communication I/F unit 112 and transmits a download request including the position information to the MFP 100 specified by the position information. Because the MFP 100 transmits the target data as described above, the download portion 83 controls the communication I/F unit 112 and receives the target data transmitted by the MFP 100.

In the case where the target data includes a command, the download portion 83 outputs the target data to the job execution portion 97 and the setting value setting portion 99.

In the case where the target data includes a command, the job execution portion 97 executes the command. For example, in the case where the target data includes a program and a command for installing the program, the job execution portion 97 executes the job of installing the program.

Further, in the case where the target data includes a setting value and a command for setting a setting value, the setting value setting portion 99 sets a setting value included in the target data. Thus, the setting value is updated.

The MFP 100 is sometimes both a proxy apparatus and a transmission destination apparatus. The functions of the transmission destination apparatus in the case where the MFP 100 is both the proxy apparatus and the transmission destination apparatus will be described here. Because the target data specified by the position information received from the download instruction receiving portion 81 is stored in the HDD 115, the download portion 83 reads out the target data from the HDD 115. Further, in the case where the target data includes a command, the download portion 83 outputs the target data to the job execution portion 97 or the setting value setting portion 99.

In this case, if the target data includes a program and a command for installing the program, the job execution portion 97 executes a job of installing the program. However, during a period in which the data transmission portion 73 is transmitting the target data to another transmission destination apparatus, the execution of the job is prevented by the job prevention portion 55.

Further, in the case where the target data includes a setting value and a command for setting the setting value, the setting value setting portion 99 sets a setting value included in the target data. However, in the case where the data transmission portion 73 cannot transmit the target data using the setting value included in the target data, setting of the setting value is prevented by the change prevention portion 57.

Figure 9:
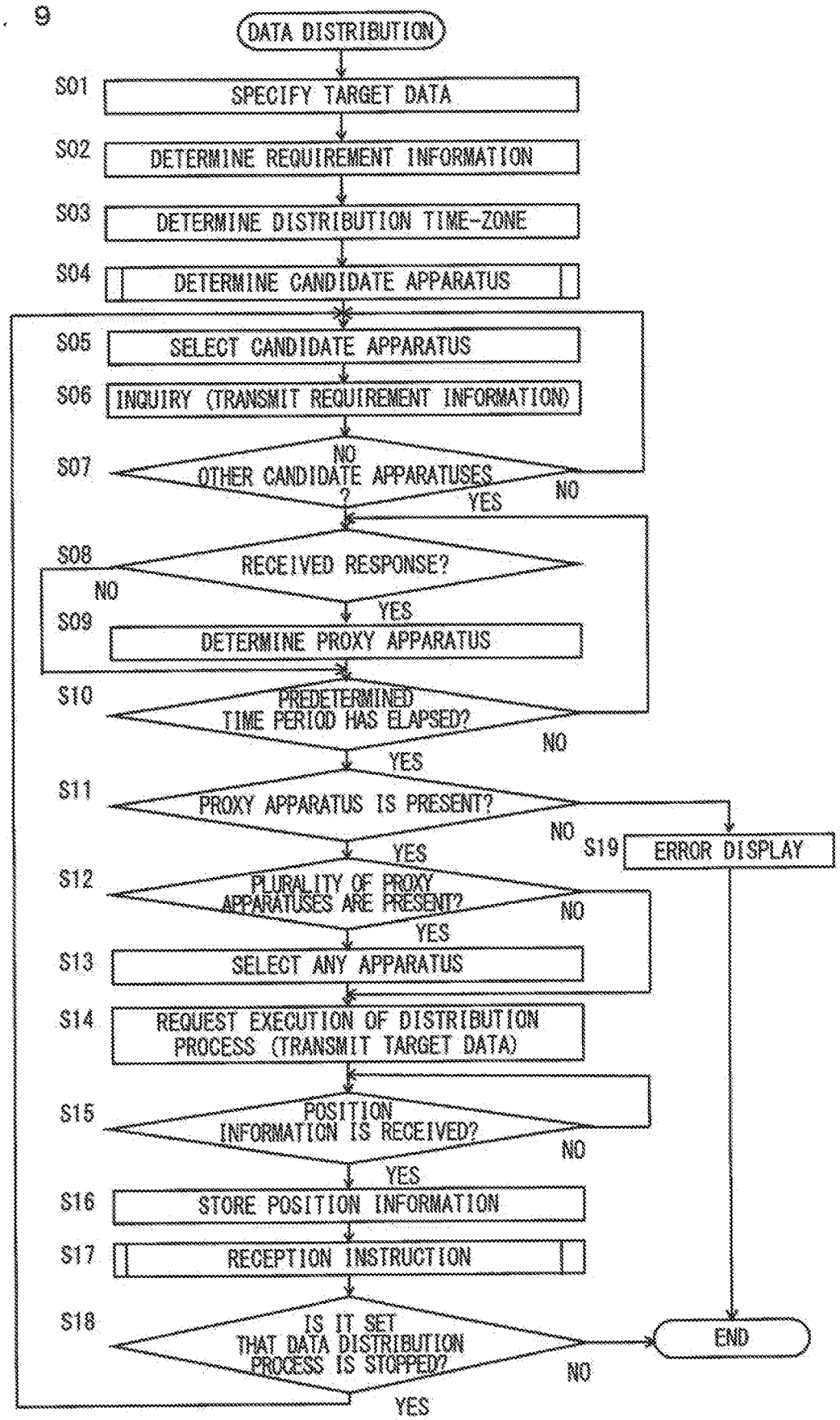
FIG. 9 is a flow chart showing one example of a flow of a data distribution process.

FIG. 9 is a flow chart showing one example of a flow of the data distribution process. The data distribution process is a process executed by the CPU 201 in the case where the CPU 201 included in the server 200 executes the data distribution program stored in the ROM 202, the HDD 204 or the CD-ROM 209. Referring to FIG. 9, the CPU 201 specifies the target data (step S01). Then, the CPU 201 determines requirement information corresponding to the size of the target data (step S02). In the next step S03, the CPU 201 determines the distribution time-zone during which the target data is distributed (step S03).

In the next step S04, the CPU 201 executes a candidate apparatus determination process, and the process proceeds to the step S05. While the details of the candidate apparatus determination process will be described below, the candidate apparatus determination process is a process of determining an apparatus, which is a candidate for being requested to execute the distribution process, from among the MFPs 100, 100A to 100D, which are the apparatuses to be managed. The case where it is determined that the MFPs 100, 100A to 100D are the candidate apparatuses will be described here as an example.

In the step S05, the CPU 201 selects one candidate apparatus as a subject of the process from among the one or more candidate apparatuses determined by the candidate apparatus determination process, and the process proceeds to the step S06. In the step S06, the CPU 201 inquires of the candidate apparatus selected as a subject of the process about whether the distribution process can be executed. Specifically, the CPU 201 controls the communication I/F unit 112, and transmits the requirement information determined in the step S02 to the candidate apparatus. In the next step S07, it is determined whether an apparatus that is not selected as a subject of the process is present among the candidate apparatuses, which are the MFPs 100, 100A to 100D in this case. If the candidate apparatus that is not selected in the step S05 as a subject of the process is present, the process returns to the step S05. If such a candidate apparatus is not present, the process proceeds to the step S08.

In the step S08, it is determined whether a response has been received from any of the candidate apparatuses of which the CPU 201 has inquired about the execution of the distribution process. If the CPU 201 controls the communication I/F unit 112 and receives a response from any of the MFPs 100, 100A to 100D, the process proceeds to the step S09. If not, the process proceeds to the step S10. In the step S09, the CPU 201 sets the candidate apparatus, which has responded, as a proxy apparatus, and the process proceeds to the step S10. In the step S10, it is determined whether a predetermined time period has elapsed since the inquiry is made in the step S06. If the predetermined time period has elapsed, the process proceeds to the step S11. If not, the process returns to the step S08.

In the step S11, it is determined whether the proxy apparatus is present. If the candidate apparatus that is set as the proxy apparatus in the step S09 is present, the process proceeds to the step S12. If not, the process proceeds to the step S19. In the step S19, an error message is displayed, and the process ends. For example, the message indicating that the proxy apparatus for executing the distribution process is not present is displayed in the display unit 206.

In the step S12, it is determined whether there are a plurality of proxy apparatuses. If a plurality of candidate apparatuses are set as the proxy apparatuses in the step S09, the process proceeds to the step S13. If one candidate apparatus is set as the proxy apparatus, the process proceeds to the step S14. In the step S13, any one of the plurality of candidate apparatuses that are set as the proxy apparatuses is selected as the proxy apparatus, and the process proceeds to the step S14. The candidate apparatus having the best hardware resources may be selected as the proxy apparatus. Further, the candidate apparatus that has responded first may be set as the proxy apparatus. The case where the MFP 100 is set as the proxy apparatus will be described below as an example.

In the step S14, the CPU 201 requests the MFP 100, which is the proxy apparatus, to execute the distribution process. Specifically, the CPU 201 controls the communication I/F unit 112, and transmits the target data specified in the step S01 to the MFP 100. In the next step S15, it is determined whether the position information has been received. The CPU 201 controls the communication I/F unit 112, and determines whether the position information has been received from the MFP 100. The process waits until the position information is received (NO in the step S15). If the position information is received (YES in the step S15), the process proceeds to the step S16.

In the step S16, the position information is stored in the HDD 204, and the process proceeds to the step S17. The position information is stored in the HDD 204 in association with the target data. Then, the CPU 201 executes a reception instruction process, and the process proceeds to the step S18. While the details of the reception instruction process will be described below, the reception instruction process is a process of allowing the transmission destination apparatus, which is the transmission destination of the target data, to receive the target data.

In the step S18, it is determined whether it is set that the data distribution process is stopped as a result of the execution of the reception instruction process. In the case where it is set that the data distribution process is stopped, the process returns to the step S05. If not, the process ends. As described below, it is set that the data distribution process is stopped as a result of the execution of the reception instruction process in the case where it is determined that the MFP 100, which is the proxy apparatus, cannot continue executing the distribution process. In this case, the CPU 201 determines a new proxy apparatus from among the MFPs 100A to 100D excluding the MFP 100, and requests the new proxy apparatus to execute the distribution process of the target data.

Figure 10:
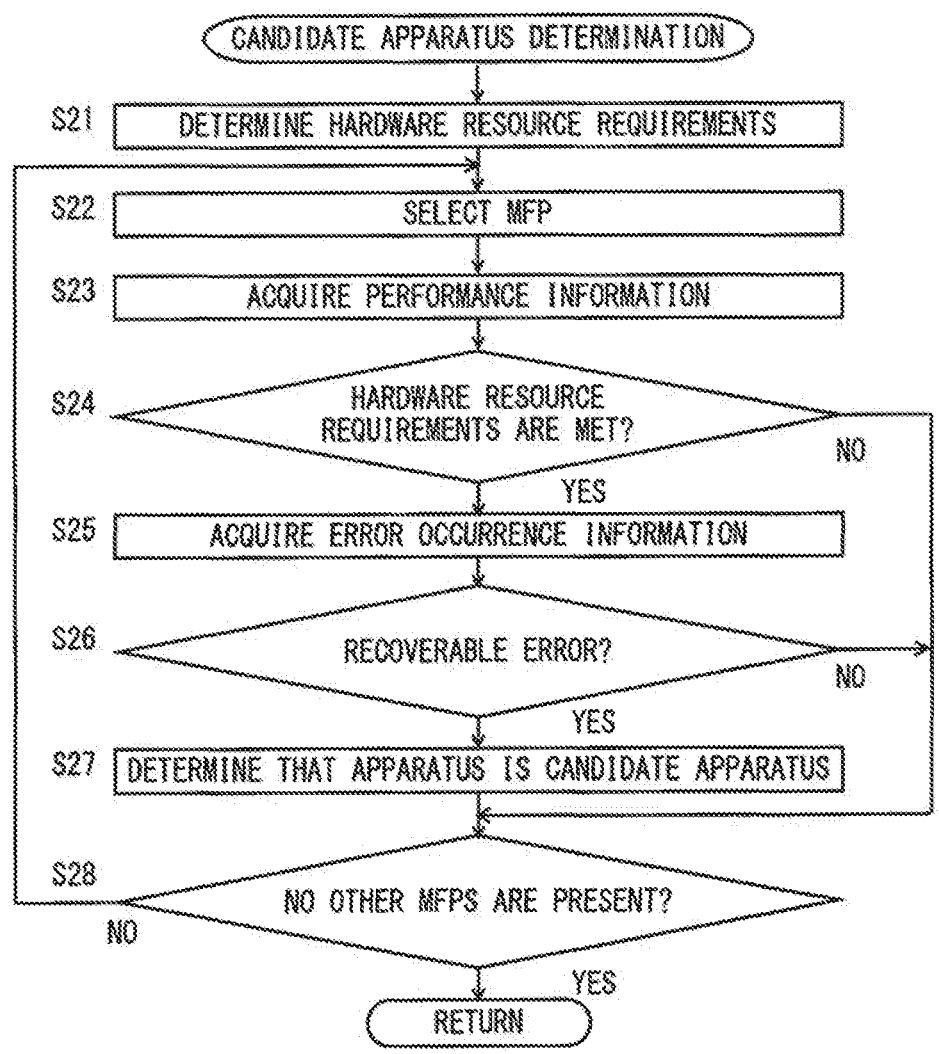
FIG. 10 is a flow chart showing one example of a flow of a candidate apparatus determination process.

FIG. 10 is a flow chart showing one example of a flow of the candidate apparatus determination process. The candidate apparatus determination process is a process executed in the step S04 of FIG. 9. Referring to FIG. 10, the CPU 201 determines the hardware resource requirements (step S21). The CPU 201 determines the hardware resource requirements corresponding to the target data with reference to the table defining the hardware resource requirements for each of the plurality of sizes of the data. In the next step S22, the CPU 201 selects one apparatus for a subject of the process from among the MFPs 100, 100A to 100D, which are the apparatuses to be managed. The case where the MFP 100 is selected as a subject of the process is described here as an example. In the next step S23, the CPU 201 acquires the performance information of the MFP 100. The CPU 201 requests the MFP 100 to transmit the performance information, and receives the performance information from the MI-P 100. A table defining the performance information of each of the MFPs 100, 100A to 100D may be prepared, and the performance information may be acquired with reference to the table.

In the next step S24, it is determined whether the performance of the hardware resources of the MFP 100 defined by the performance information meets the hardware resource requirements. If the performance of the hardware resources of the MFP 100 is equal to or greater than a lower limit value defined by the hardware resource requirements, it is determined that the hardware requirements are met. If the MFP 100 meets the hardware resources requirements, the process proceeds to the step S25. If not, the process proceeds to the step S28.

In the step S25, the CPU 201 acquires error occurrence information from the MFP 100. The CPU 201 requests the MFP 100 to transmit the error occurrence information, and acquires the error occurrence information from the MFP 100. Then, it is determined whether an error specified by the error occurrence information is a recoverable error (step S26). If the error is recoverable, the process proceeds to the step S27. If not, the process proceeds to the step S28.

In the step S27, the MFP 100 is set as the candidate apparatus, and the process proceeds to the step S28. In the step S28, it is determined whether an apparatus that is not selected as a subject of the process is present among the MFPs 100, 100A to 100D, which are the apparatuses to be managed. If the apparatus that is not selected as a subject of the process is present, the process returns to the step S22. If not, the process returns to the data distribution process. In the case where the process returns to the step S22, any one of the MFPs 100A to 100D, which are the apparatuses to be managed, is selected, and the process of the steps S23 to S27 is performed. Thus, all of the apparatuses, which meet the hardware resource requirements and in which an unrecoverable error has not occurred, among the MFPs 100, 100A to 100D, which are the apparatuses to be managed, are set as the candidate apparatuses.

Figure 11:
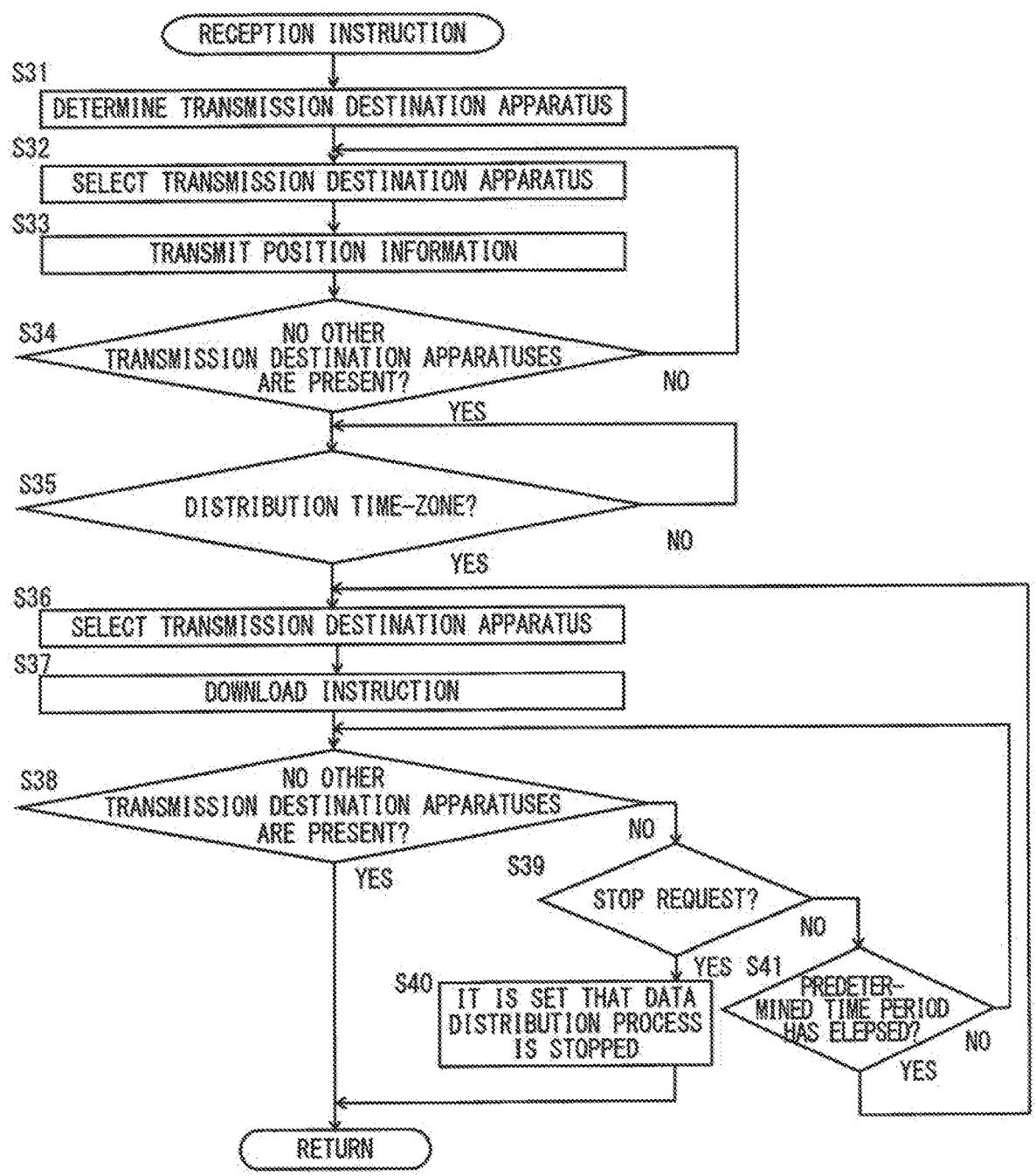
FIG. 11 is a diagram showing one example of a flow of a reception instruction process.

FIG. 11 is a diagram showing one example of a flow of the reception instruction process. The reception instruction process is a process executed in the step S17 of FIG. 9. Referring to FIG. 11, the CPU 201 determines transmission destination apparatuses from among the MFPs 100, 100A to 100D, which are the apparatuses to be managed (step S31). The case where it is determined that the MFPs 100, 100A to 100D are the transmission destination apparatuses will be described here as an example. The transmission destination apparatuses are apparatuses to which the target data is transmitted, and are defined by the target data. A table that associates the target data with the apparatuses to which the target data is transmitted is prepared, and the transmission destination apparatuses are determined with reference to the table. In the next step S32, the transmission destination apparatus, which is a subject of the process, is selected. The case where the MFP 100A is selected as the subject of the process is described here as an example.

In the next step S33, the CPU 201 controls the communication unit 205, and transmits the position information to the MFP 100A. Then, it is determined whether the transmission destination apparatus that is not selected as a subject of the process in the step S32 is present (step S34). If the transmission destination apparatus that is not selected as a subject of the process is present, the process returns to the step S31. If not, the process proceeds to the step S35. In a stage where the process proceeds to the step S35, the position information is transmitted to each of the MFPs 100, 100A to 100D, which are the transmission destination apparatuses.

In the step S35, the process waits until a current time point is in the distribution time-zone (NO in the step S35). When the current time point is in the distribution time-zone (YES in the step S35), the process proceeds to the step S36. In the step S36, the CPU 201 selects a transmission destination apparatus, which is a subject of the process. The case where the MFP 100A, which is the transmission destination apparatus, is selected as a subject of the process will be described as an example.

In the next step S37, the CPU 201 controls the communication unit 205, and transmits a download instruction to the MFP 100A. Then, it is determined whether the transmission destination apparatus, which is not selected as a subject of the process, is present (step S38). If the transmission destination apparatus, which is not selected as a subject of the process, is present, the process proceeds to the step S39. If not, the process returns to the data distribution process.

In the step S39, it is determined whether there has been a stop request from the proxy apparatus. Because the MFP 100 is the proxy apparatus in this case, the CPU 201 controls the communication unit 205, and determines whether the stop signal has been received from the MFP 100. If the stop signal has been received, the process proceeds to the step S40. If not, the process proceeds to the step S41. In the step S41, it is determined whether a predetermine time period has elapsed since the transmission of the download instruction. If the predetermined time period has elapsed since the transmission of the download instruction, the process returns to the step S36. If not, the process returns to the step S38. During a period in which the steps S36 to S41 are performed, the download instructions are transmitted to the MFPs 100, 100A to 100D, which are the transmission destination apparatuses, at predetermined time intervals. Therefore, simultaneous download of the target data can be avoided, and an increase in load on the proxy apparatus can be prevented. Further, a packet collision can be avoided, and the LAN 3 can be efficiently utilized. Further, in the case where the stop signal is received from the MFP 100, which is the proxy apparatus, in the middle of the reception instruction process, the transmission of the download instruction is stopped, and the reception instruction process is stopped. Thus, the CPU 201 can detect that execution of the data distribution process cannot continue.

Figure 12:
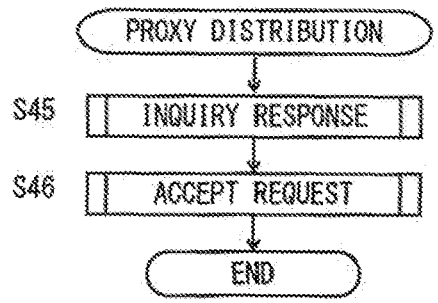
FIG. 12 is a flow chart showing one example of a flow of a proxy distribution process.

FIG. 12 is a flow chart showing one example of a flow of a proxy distribution process. The proxy distribution process is a process executed by the CPU 111 in the case where the CPU 111 included in the MFP 100 executes a proxy distribution program stored in the ROM 113, the HDD 115 or the CD-ROM 118. Referring to FIG. 12, the CPU 111 included in the MFP 100 executes an inquiry response process (step S45), and executes a request acceptance process (step S46).

Figure 13:
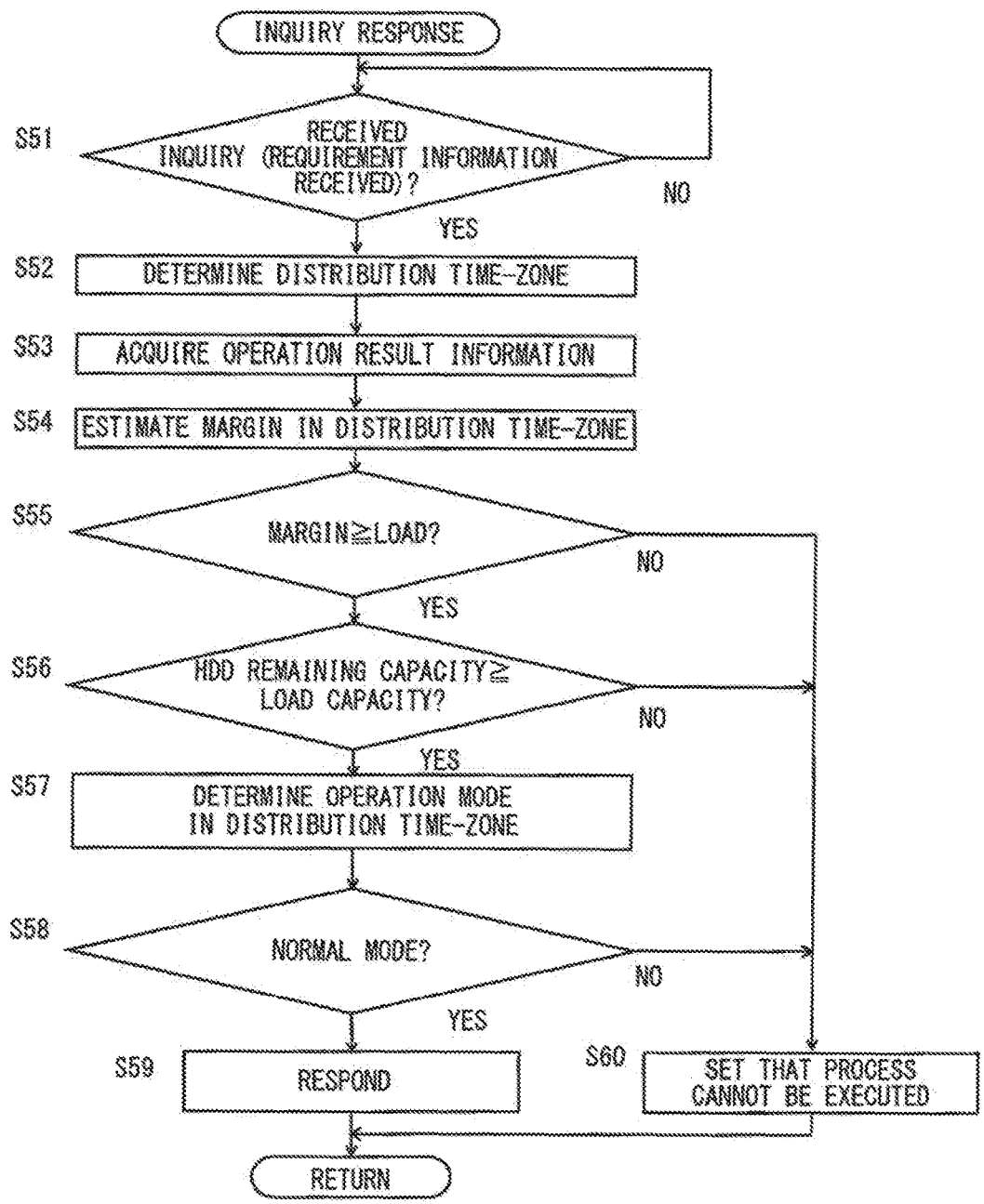
FIG. 13 is a flow chart showing one example of a flow of an inquiry response process.

FIG. 13 is a flow chart showing one example of a flow of the inquiry response process. The inquiry response process is a process executed in the step S45 of FIG. 12. Referring to FIG. 13, the CPU 111 determines whether an inquiry has been received from the server 200 (step S51). Specifically, the CPU 111 controls the communication I/F unit 112. In the case where receiving requirement information from the server 200, the CPU 111 determines that an inquiry has been received. The process waits until the CPU 111 receives the requirement information (NO in the step S51). If the requirement information is received (YES in the step S51), the process proceeds to the step S52. The requirement information defines a load required to execute the distribution process of the target data defined by the requirement information. Specifically, the requirement information includes a lower limit value of an amount of fixedly storable data, a lower limit value of an empty space of the memory used as a work area by the CPU, and a lower limit value of a proportion of the idle-time of the CPU per unit time.

In the step S52, the distribution time-zone is determined. The CPU 111 controls the communication I/F unit 112, receives the time-zone information from the server 200, and determines the distribution time-zone indicated by the time-zone information. Then, the CPU ill acquires the operation result information (step S53). The CPU 111 reads out the operation result information stored in the HDD 115. Then, a margin in the distribution time-zone is estimated (step S54). Specifically, with reference to the operation result information, the CPU 111 specifies a job, which is executed on a date different from but in the time-zone same as the distribution time-zone, and calculates a proportion of a time period during which a job is not executed in the time-zone as a margin indicating the idle-time of the CPU. Further, the CPU 111 estimates an average size of an empty space of the RAM 114 on the date different from but in the time-zone same as the distribution time-zone defined by the time-zone information as a margin indicating an empty space of the RAM 114.

In the step S55, the CPU 111 compares the margin estimated in the step S54 with a load defined by the requirement information received in the step S51. If the margin is equal to or greater than the load, the process proceeds to the step S56. If not, the process proceeds to the step S60. Specifically, if a proportion of the idle-time, which is estimated as a margin, of the CPU is equal to or greater than a lower limit value of the idle-time of the CPU included in the requirement information, it is determined that the margin is equal to or greater than the load. If the idle-time, which is estimated as the margin, of the CPU is smaller than the lower limit of the proportion of the idle-time of the CPU per unit time included in the requirement information, it is determined that the margin is smaller than the load. Further, if the empty space, which is estimated as the margin, of the RAM 114, is equal to or greater than the lower limit value of the empty space of the memory included in the requirement information, it is determined that the margin is smaller than the load. If both of the proportion of the idle-time, estimated as the margin, of the CPU and the empty space, estimated as the margin, of the RAM 114 are equal or larger than the lower limit value of the load defined by the requirement information, it is determined that the margin is equal to or greater than the load.

In the step S56, a remaining empty space of the HDD 115 is compared with the load capacity. Specifically, if the capacity of the empty space in which data can be stored in the HDD 115 is equal to or greater than a lower limit value of an amount of fixedly storable data included in the requirement information, it is determined that the margin is equal to or greater than the load, and the process proceeds to the step S57. If not, the process proceeds to the step S60.

In the step S57, operation modes in the distribution time-zone are determined with reference to the schedule defining a power saving mode period and a normal mode period. Then, the process branches depending on the determined operation mode (step S58). If the operation mode in the distribution time-zone is the normal mode, the process proceeds to the step S59. If the operation mode is the power saving mode, the process proceeds to the step S60. In the step S59, the CPU 111 responds to the server 200, and notifies the server 200 that the distribution process can be executed, and the process returns to the proxy distribution process. In the step S60, it is set that the distribution process cannot be executed, and the process returns to the proxy distribution process.

Figure 14:
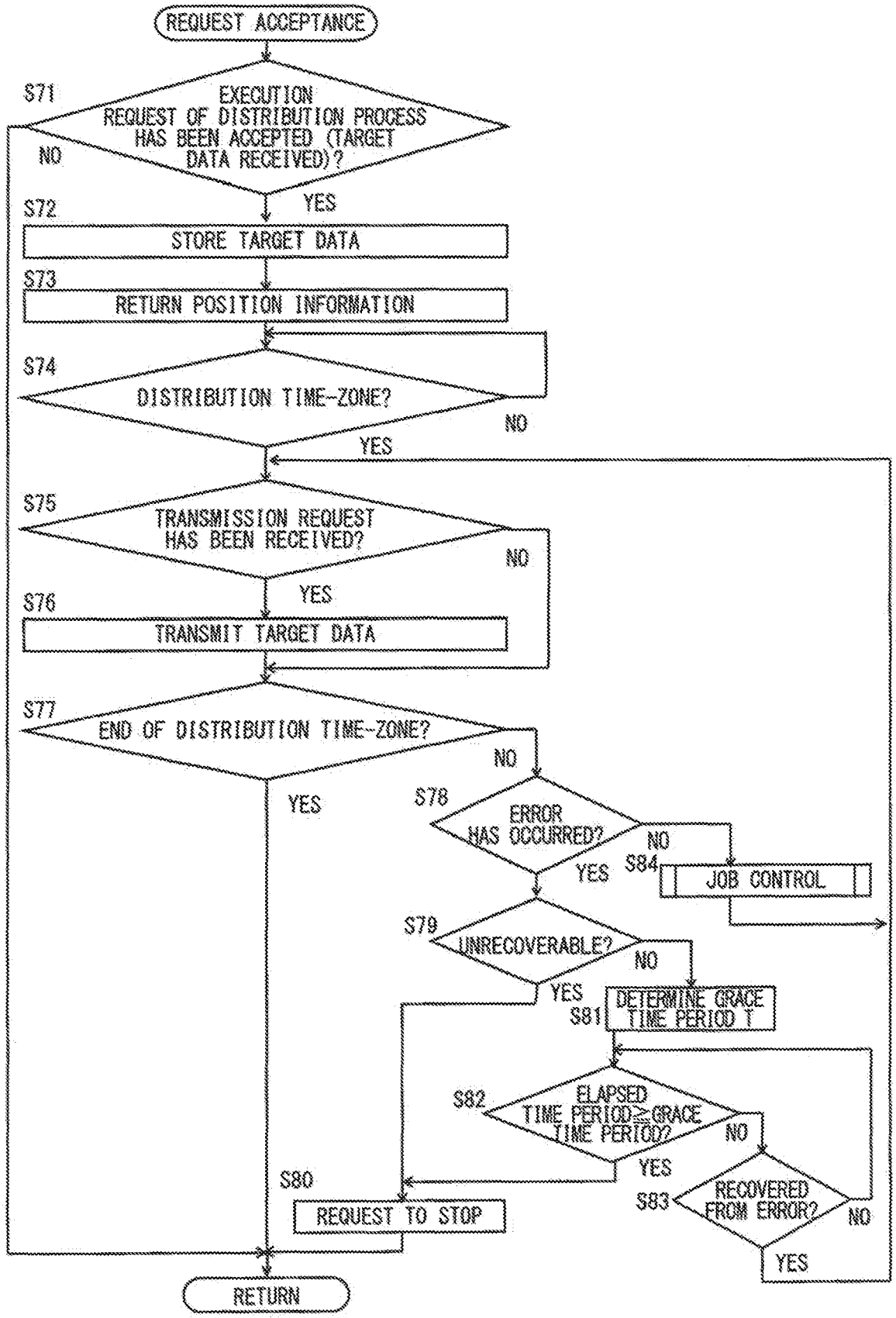
FIG. 14 is a flow chart showing one example of a flow of a request acceptance process.

FIG. 14 is a flow chart showing one example of a flow of the request acceptance process. The request acceptance process is a process executed in the step S42 of FIG. 12. Referring to FIG. 12, the CPU 111 determines whether an execution request of the distribution process has been accepted (step S71). When the communication I/F unit 112 receives the target data from the server 200, it is determined that an execution request of the distribution process has been accepted. If the target data has been received, the process proceeds to the step S72. If not, the process returns to the proxy distribution process.

In the step S72, the CPU 111 stores the target data in the HDD 115, and the process proceeds to the step S73. In the step S73, the CPU 111 returns the position information indicating the network address of the target data, and the process proceeds to the step S74.

In the step S74, the process waits until the current date and time are in the distribution time-zone (NO in the step S74). If the current date and time are later than the start date and time of the distribution time-zone (YES in the step S74), the process proceeds to the step S75. In the step S75, it is determined whether the transmission request has been received. If the communication I/F unit 112 receives the transmission request from any one of the MFPs 100A to 100D, which are the transmission destination apparatuses, the process proceeds to the step S76. If not, the process proceeds to the step S77. In the step S76, the target data specified by the position information included in the transmission request is transmitted to the transmission destination apparatus, which has transmitted the transmission request, and the process proceeds to the step S77.

In the step S77, it is determined whether a current time point has passed the distribution time-zone. If the current date and time are later than the end date and time of the distribution time-zone, the process returns to the proxy distribution process. If not, the process proceeds to the step S78. In the step S78, it is determined whether an error has occurred. If an error has occurred, the process proceeds to the step S79. If not, the process proceeds to the step S84. In the step S84, the job control process is executed, and the process returns to the step S75. Details of the job control process will be described below.

In the step S79, it is determined whether the occurring error is unrecoverable. If the error is unrecoverable, the process proceeds to the step S80. If the error is recoverable, the process proceeds to the step S81. In the step S80, the CPU 111 transmits a request to stop the distribution process to the server 200, and the process returns to the proxy distribution process. Specifically, the CPU 111 controls the communication OF unit 112, and transmits a stop signal to the server 200.

In the step S81, a grace time period T is determined in advance with respect to the occurring error. In the next step S82, it is determined whether the elapsed time period from the occurrence of the error is equal to or greater than the grace time period T. If the elapsed time period is equal to or greater than the grace time period T, the process proceeds to the step S80. If not, the process proceeds to the step S83. In the step S83, it is determined if the apparatus has recovered from the error. If the apparatus has recovered from the error, the process returns to the step S75. If not, the process returns to the step S82. In the case where the apparatus has not recovered from the error even if a time period equal to or greater than the grace time period T has elapsed, the process proceeds to the step S80. In the step S80, the CPU 111 transmits a request to stop the distribution process to the server 200. This is because, in the case where the apparatus has not recovered from the recoverable error even if the graced time period has elapsed, the power of the MFP 100 is sometimes switched OFF, and the distribution process can no longer be executed in that case.

Figure 15:
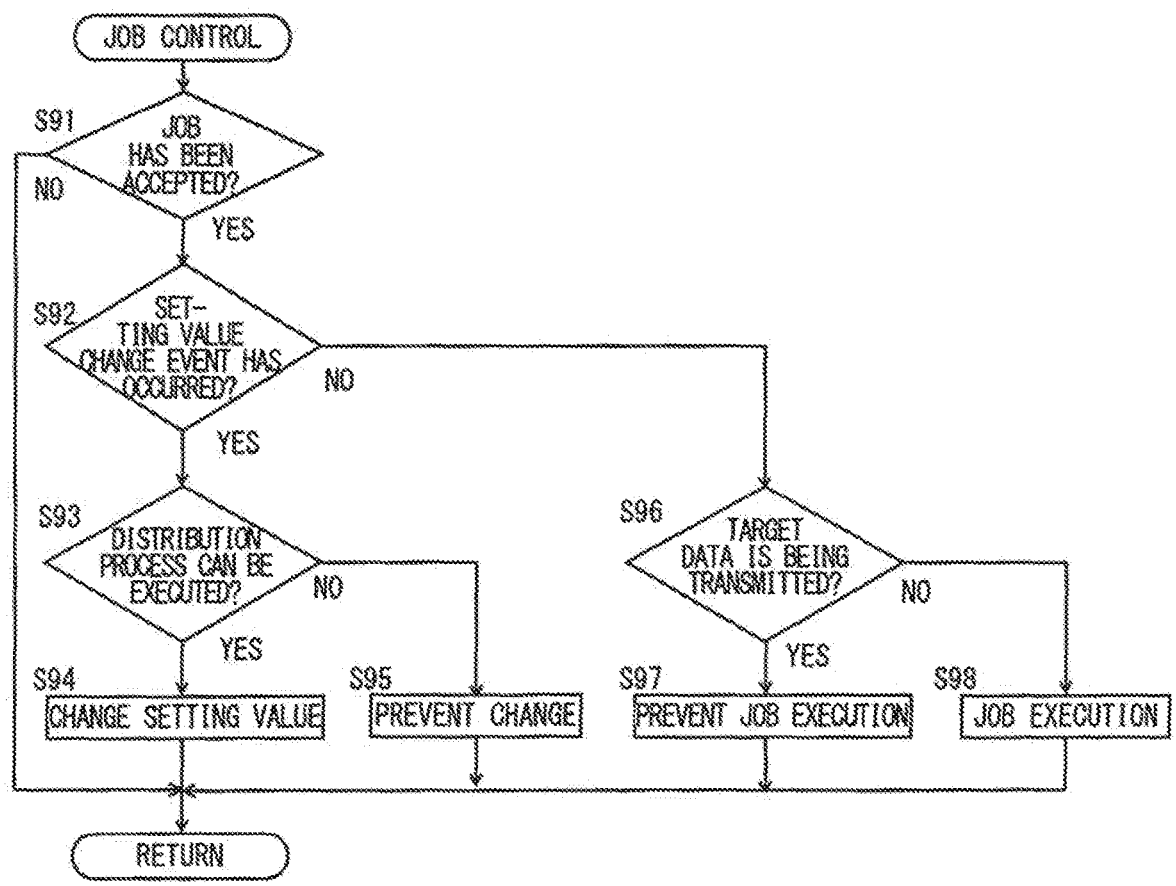
FIG. 15 is a flow chart showing one example of a flow of a job control process.

FIG. 15 is a flow chart showing one example of a flow of a job control process. The job control process is a process executed in the step S84 of FIG. 14. Referring to FIG. 15, the CPU 111 determines whether a job has been accepted (step S91). If the job has been accepted, the process proceeds to the step S92. If not, the process returns to the request acceptance process. In the step S92, it is determined whether an event in which a setting value is changed has occurred. In the case where the target data including a command for changing a setting value is received, the event in which the setting value is changed includes the case where an operation of inputting in the operation unit 163 by the user is an operation of changing the setting value. If the event in which the setting value is changed has occurred, the process proceeds to the step S93. If not, the process proceeds to the step S96.

In the step S93, it is determined whether the distribution process can be executed with the changed setting value. If the distribution process can be executed, the process proceeds to the step S94. If the distribution process cannot be executed, the process proceeds to the step S95. In the step S94, the setting value is changed, and the process returns to the request acceptance process. In the step S95, the setting value is prevented from being changed, and the process returns to the request acceptance process.

In the step S96, it is determined whether the target data is being transmitted. If the target data is being transmitted, the process proceeds to the step S97. If not, the process proceeds to the step S98. In the step S97, the execution of the job is prevented, and the process returns to the request acceptance process. In the step S98, the job is executed, and the process returns to the request acceptance process.

Figure 16:
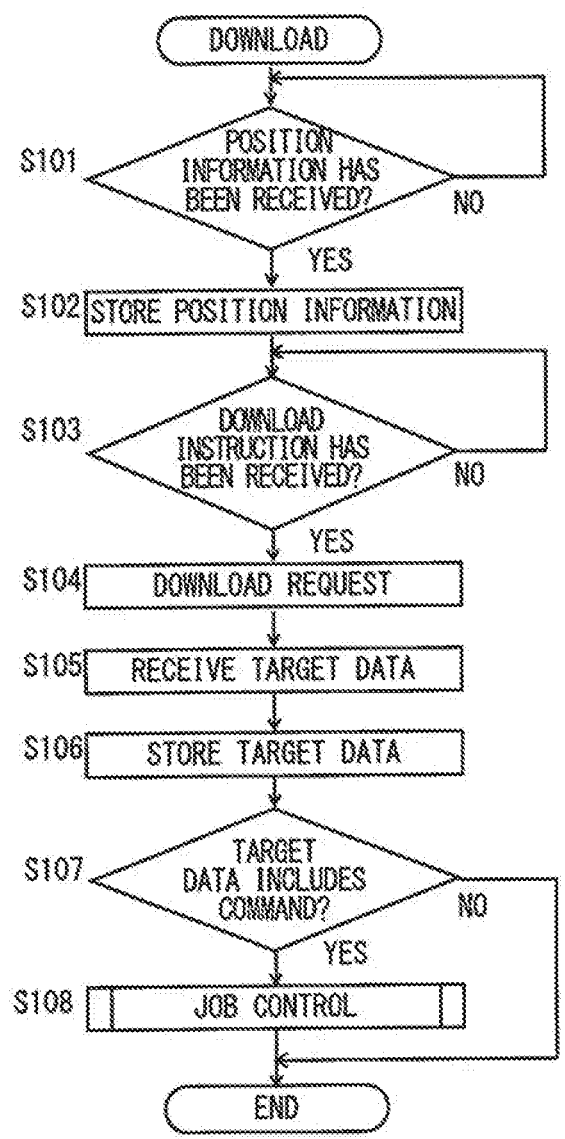
FIG. 16 is a flow chart showing one example of a flow of a download process.

FIG. 16 is a flow chart showing one example of a flow of a download process. The download process is a process executed by the CPU 111 in the case where the CPU 111 included in the MFP 100 executes a download program stored in the ROM 113, the HDD 115 or the CD-ROM 118. The download program is part of the data distribution program. Referring to FIG. 16, the CPU 111 determines whether the position information has been received from the server 200 (step S101). The process waits until the communication I/F unit 112 receives the position information from the server 200 (NO in the step S101). If the position information has been received (YES in the step S101), the process proceeds to the step S102.

In the step S102, the position information is stored in the HDD 115, and the process proceeds to the step S103. In the step S103, it is determined whether a download instruction has been received. The process waits until the communication I/F unit 112 receives the download instruction from the server 200 (NO in the step S103). If the position information has been received (YES in the step S103), the process proceeds to the step S104.

In the step S104, CPU 111 transmits a download request, and the process proceeds to the step S105. The CPU 111 controls the communication I/F unit 112 and transmits the download request including the position information to a proxy apparatus, which is defined by the position information and which is the MFP 100 in this case. The MFP 100, which is the proxy apparatus, transmits the target data in response to reception of the download request. Thus, in the step S105, the CPU 111 controls the communication I/F unit 112 and receives the target data from the MFP 100, which is the proxy apparatus. Then, the target data is stored in the HDD 115 (step S106), and the process proceeds to the step S107.

In the step S107, it is determined whether the target data includes a command. If the target data includes a command, a job is generated, and the process proceeds to the step S108. If not, the process ends. In the case where the target data includes a command, the CPU 111 generates a job of processing the target data in accordance with the command. In the step S108, the job control process shown in FIG. 15 is executed, and the process ends.

As described above, in the information processing system 1 in the present embodiment, the server 200 inquires of one or more candidate apparatuses among the MFPs 100, 100A to 100D, for example, each of the MFPs 100, 100A to 100D, about whether the distribution process can be executed, the distribution process being a process of transmitting the target data to each of the one or more transmission destination apparatuses among the MFPs 100, 100A to 100D, which are the apparatuses to be managed. Further, the server 200 determines that an apparatus, which responds to the inquiry about whether the distribution process can be executed, among the MFPs 100, 100A to 100D, which are the candidate apparatuses, is a proxy apparatus. Then, the server 200 requests the proxy apparatus to execute the distribution process. Therefore, the server 200 requests the proxy apparatus to execute the distribution process, so that a load on the server 200 can be reduced.

In response to the inquiry about whether the distribution process can be executed from the server 200, each of the MFPs 100, 100A to 100D, which are the candidate apparatuses, determines whether the distribution process can be executed based on the margin of the hardware resources used for execution of the distribution process. In the case where it is determined that the distribution process can be executed, each of the MFPs 100, 100A to 100D responds to the inquiry about whether the distribution process can be executed. Therefore, each of the MFPs 100, 100A to 100D determines whether the distribution process can be executed based on the margin of the hardware resources used for the execution of the distribution process, so that a load on the server 200 can be reduced.

Further, the server 200 transmits the requirement information indicating a lower limit of the load on the hardware resources required for the execution of the distribution process to the plurality of information processing apparatuses. In the case where the margin of the hardware resources is equal to or greater than a lower limit of the load on the hardware resources, which is required for the execution of the process of transmitting the target data and is defined by the requirement information, each of the MFPs 100, 100A to 100D, which are the candidate apparatuses, determines that the distribution process can be executed. Therefore, in each of the MFPs 100, 100A to 100D, which are the candidate apparatuses, whether the distribution process can be executed can be determined in response to the change of the margin of the hardware resources. Further, it is not necessary to acquire the margin of the hardware resources of each of the MFPs 100, 100A to 100D, which are the candidate apparatuses, so that an amount of data being transmitted through the Internet 5 can be reduced, and the load on the server 200 can be reduced Further, the server 200 acquires the performance information indicating the performance of the hardware resources from each of the MFPs 100, 100A to 100D, which are the apparatuses to be managed, and determines one or more candidate apparatuses from among the MFPs 100, 100A to 100D, which are the apparatuses to be managed, based on the acquired performance information. Therefore, the server 200 can determine that an apparatus, which includes hardware resources having performance suitable for execution of the distribution process, from among the MFPs 100, 100A to 100D, which are the apparatuses to be managed, is a candidate apparatus.

Further, the server 200 acquires the error occurrence information regarding an error that is occurring in the apparatus from each of the MFPs 100, 100A to 100D, which are the apparatuses to be managed, and does not determine that an apparatus, in which an unrecoverable error is occurring, among the MFPs 100, 100A to 100D, which are the apparatuses to be managed, is a candidate apparatus. The apparatus in which an unrecoverable error is occurring sometimes cannot execute the distribution process, so that the server 200 can determine that an apparatus having high probability of being able to execute the distribution process is the candidate apparatus.

Further, an apparatus that is selected as the proxy apparatus from among the MFPs 100, 100A to 100D, which are the candidate apparatuses, for example, the MFP 100, determines whether the execution of the distribution process continues based on the error detected after the execution of the distribution process is requested by the server 200. In response to being notified that the execution of the distribution process is not to be continued in the MFP 100, the server 200 determines that an apparatus, which is different from the MFP 100, among the MFP 100, 100A to 100D, which are the apparatuses to be managed and the candidate apparatuses, is a new proxy apparatus. Therefore, the target data can be transmitted to all of the one or more transmission destination apparatuses.

Further, after being requested to execute the distribution process by the server 200, the MFP 100, which is the proxy apparatus, prevents the execution of a job while transmitting the target data. Therefore, the MFP 100 can give priority to the transmission of the target data over the execution of data, and transmit the target data as fast as possible.

Further, after being requested to execute the distribution process by the server 200, the MFP 100, which is the proxy apparatus, prevents a setting value from being changed to a setting value that disables the transmission of the target data. Therefore, the MFP 100 can remain capable of transmitting the target data.

Further, each of the MFPs 100, 100A to 100D, which are the apparatuses to be managed, is connected to the LAN 3, and the server 200 is connected to the Internet 5. Therefore, the target data is transmitted from the MFP 100, which is the proxy apparatus, to each of the MFPs 100A to 100D, which are the transmission destination apparatuses. Thus, it is not necessary to use the Internet 5. Therefore, an amount of data transmitted through the Internet 5 can be reduced.

Further, the server 200 transmits the target data to the MFP 100, which is the proxy apparatus, acquires the position information indicating the network address of the target data from the MFP 100, and transmits the position information to each of one or more MFPs among the MFPs 100, 100A to 100D, which are the transmission destination apparatuses. Each of the MFPs 100A to 100D, which are the transmission destination apparatuses, downloads the target data from the MFP 100, which is the proxy apparatus. Therefore, it is not necessary for the server 200 to transmit the target data to the MFPs 100A to 100D, which are the transmission destination apparatuses. Thus, a load on the server 200 can be reduced.

Further, in the case where being requested to execute the distribution process, the MFP 100, which is the proxy apparatus, transmits the target data in response to receiving a download request including the position information from any one of the MFPs 100A to 100D, which are the transmission destination apparatuses. Thus, it is not necessary for the MFP 100, which is the proxy apparatus, to know the MFPs 100A to 100D, which are the transmission destinations of the target data. Therefore, a process executed in the MFP 100, which is the proxy apparatus, can be simplified.

Although embodiments of the present invention have been described and illustrated in detail, it is clearly understood that the same is by way of illustration and example only and not limitation, the scope of the present invention should be interpreted by terms of the appended claims.

What is claimed is:

1. An information processing system that includes a server and a plurality of information processing apparatuses communicable with the server,
    the server comprising a first hardware processor, and
    each of the plurality of information processing apparatuses comprising a second hardware processor, wherein
    the first hardware processor
    selects one or more candidate apparatuses from among the plurality of information processing apparatuses, which are candidates for being information processing apparatuses that execute a distribution process of transmitting target data to each of one or more transmission destination apparatuses from among the plurality of information processing apparatuses, based on performance of hardware resources which are respectively included in the plurality of information processing apparatuses and are required for the distribution process, the target data including at least one of a program for installation, address information, and a setting value,
    inquires of the one or more selected candidate apparatuses about whether the distribution process is executable, and
    determines that an apparatus, which responds to an inquiry about whether the distribution process is executable, among the one or more candidate apparatuses, is a proxy apparatus, and
    requests the proxy apparatus to execute the distribution process, and
    the second hardware processor,
    in response to the inquiry about whether the distribution process is executable from the server, determines whether the distribution process is executable based on a margin of the hardware resources, and
    in the case where it is determined that the distribution process is executable, responds to the inquiry about whether the distribution process is executable.

2. The information processing system according to claim 1, wherein
    the first hardware processor further transmits requirement information, indicating a lower limit of a load on the hardware resources required for execution of the distribution process, to the plurality of information processing apparatuses, and
    the second hardware processor determines that, in the case where the margin of the hardware resources is equal to or greater than the lower limit of the load indicated by the requirement information, the distribution process is executable.

3. The information processing system according to claim 1, wherein the first hardware processor acquires performance information indicating performance of the hardware resources from each of the plurality of information processing apparatuses, and selects the one or more candidate apparatuses from among the plurality of information processing apparatuses based on the performance information acquired from each of the plurality of information processing apparatuses.

4. The information processing system according to claim 1, wherein the first hardware processor acquires error occurrence information relating to occurring errors from the plurality of information processing apparatuses, and does not select an apparatus in which an unrecoverable error is present among the plurality of information processing apparatuses to be the one or more candidate apparatuses.

5. The information processing system according to claim 1, wherein the second hardware processor, in the case where functioning as the proxy apparatus, further detects an occurrence of an error, and determines whether execution of the distribution process continues based on an error detected after execution of the distribution process is requested, and the first hardware processor, in response to being notified by the proxy apparatus that the execution of the distribution process does not continue, further selects a new proxy apparatus different from the proxy apparatus from among the plurality of information processing apparatuses.

6. The information processing system according to claim 1, wherein the second hardware processor further executes a job using the hardware resources, and in the case where functioning as the proxy apparatus, further prevents execution of a predetermined type of the job when transmitting the target data after being requested to execute the distribution process by the server.

7. The information processing system according to claim 1, wherein the second hardware processor further sets a setting value used for control of the hardware resources, and in the case where functioning as the proxy apparatus, further prevents a change of the setting value to a setting value that disables transmission of the target data after being requested to execute the distribution process by the server.

8. The information processing system according to claim 1, wherein the second hardware processor is connected to a first network, and communicates with another information processing apparatus among the plurality of information processing apparatuses via the first network, and the first hardware processor is connected to a second network different from the first network, and communicates with each of the plurality of information processing apparatuses via the first network and the second network.

9. The information processing system according to claim 1, wherein the first hardware processor transmits the target data to the proxy apparatus, acquires position information indicating a position at which the target data is stored from the proxy apparatus, and notifies each of the one or more transmission destination apparatuses of the position information, and the second hardware processor, in the case where functioning as the transmission destination apparatus, downloads the target data specified by the position information from the proxy apparatus.

10. The information processing system according to claim 9, wherein the second hardware processor functions as the proxy apparatus, in the case where being requested to execute the distribution process by the server, stores the target data transmitted from the server in an externally accessible region, transmits position information indicating a position at which the target data is stored to the server, and in response to reception of a download request including the position information from any one of the one or more transmission destination apparatuses, transmits the target data.

11. The information processing system according to claim 1, wherein the second hardware processor communicates with another information processing apparatus via a predetermined network.

12. The information processing system according to claim 1, wherein the margin corresponds to an idle condition of each information processing apparatus that is executing a job.

13. The information processing system according to claim 1, wherein the margin corresponds to an idle condition of the hardware resources.

14. The information processing system according to claim 1, wherein the proxy apparatus distributes the target data to another information processing apparatus other than the proxy apparatus.

15. A server comprising a hardware processor communicably connected to a plurality of information processing apparatuses, wherein the hardware processor, selects one or more candidate apparatuses from among the plurality of information processing apparatuses, which are candidates for being information processing apparatuses that execute a distribution process of transmitting target data to each of one or more transmission destination apparatuses from among the plurality of information processing apparatuses, based on performance of hardware resources which are respectively included in the plurality of information processing apparatuses and are required for the distribution process, the target data including at least one of a program for installation, address information, and a setting value, inquires of the one or more selected candidate apparatuses about whether the distribution process is executable such that each of the one or more selected candidate apparatuses determines whether the distribution process is executable based a margin of hardware resources used for execution of the distribution process, determines that an apparatus, which responds to an inquiry about whether the distribution process is executable, among the one or more candidate apparatuses is a proxy apparatus, and
requests the proxy apparatus to execute the distribution process.

16. The server according to claim 15, wherein
the hardware processor
acquires performance information indicating performance of the hardware resources from each of the plurality of information processing apparatuses, and
selects the one or more candidate apparatuses from among the plurality of information processing apparatuses based on performance information acquired from each of the plurality of information processing apparatuses.

17. The server according to claim 15, wherein
the hardware processor acquires error occurrence information relating to an occurring errors from each of the plurality of information processing apparatuses, and
does not select an apparatus in which an unrecoverable error is present among the plurality of information processing apparatuses to be the one or more candidate apparatuses.

18. The server according to claim 15, wherein
the hardware processor, in response to determination by the proxy apparatus that execution of the distribution process does not continue, selects a new proxy apparatus different from the proxy apparatus from among the plurality of information processing apparatuses.

19. The server according to claim 15, wherein
the hardware processor is connected to a second network different from a first network to which each of the plurality of information processing apparatuses is connected, and communicates with the plurality of information processing apparatuses via the first network and the second network.

20. The server according to claim 15, wherein
the hardware processor
transmits the target data to the proxy apparatus,
acquires position information indicating a position at which the target data is stored from the proxy apparatus,
notifies each of the one or more transmission destination apparatuses of the position information, and
causes each of the one or more transmission destination apparatuses to download the target data specified by the position information.

21. The server according to claim 15, wherein
the plurality of information processing apparatuses are communicably connected to one another via a predetermined network.

22. The server according to claim 15, wherein
the margin corresponds to an idle condition of each information processing apparatus that is executing a job.

23. The server according to claim 15, wherein
the margin corresponds to an idle condition of the hardware resources.

24. The server according to claim 15, wherein the proxy apparatus distributes the target data to another information processing apparatus other than the proxy apparatus.

25. A non-transitory computer-readable recording medium encoded with a data distribution program causing a computer, which controls a server communicably connected to a plurality of information processing apparatuses, to
select one or more candidate apparatuses from among the plurality of information processing apparatuses, which are candidates for being information processing apparatuses that execute a distribution process, of transmitting target data to each of one or more transmission destination apparatuses from among the plurality of information processing apparatuses, based on performance of hardware resources which are respectively included in the plurality of information processing apparatuses and are required for the distribution process, the target data including at least one of a program for installation, address information, and a setting value, and
inquire of the one or more candidate apparatuses about whether the distribution process is executable such that each of the one or more candidate apparatuses determines whether the distribution process is executable based on a margin of hardware resources used for execution of the distribution process,
determine that an apparatus, which responds to an inquiry about whether the distribution process is executable, among the one or more candidate apparatuses is a proxy apparatus, and
request the proxy apparatus to execute the distribution process.

26. The non-transitory computer-readable recording medium encoded with a data distribution program according to claim 25, wherein
the data distribution program further causes the computer to
acquire performance information indicating performance of the hardware resources from each of the plurality of information processing apparatuses, and
select the one or more candidate apparatuses from among the plurality of information processing apparatuses based on the performance information acquired from each of the plurality of information processing apparatuses.

27. The non-transitory computer-readable recording medium encoded with a data distribution program according to claim 25, wherein
the data distribution program further causes the computer to acquire error occurrence information relating to an occurring error from each of the plurality of information processing apparatuses, and
not to determine that an apparatus in which an unrecoverable error is present among the plurality of information processing apparatuses is the one or more candidate apparatuses.

28. The non-transitory computer-readable recording medium encoded with a data distribution program according to claim 25, wherein
the data distribution program further causes the computer to, in response to determination by the proxy apparatus that execution of the distribution process does not continue, select a new proxy apparatus different from the proxy apparatus from among the plurality of information processing apparatuses.

29. The non-transitory computer-readable recording medium encoded with a data distribution program according to claim 25, wherein
the server is connected to a second network different from a first network to which each of the plurality of information processing apparatuses is connected, and is communicable with each of the plurality of information processing apparatuses via the first network and the second network.

30. The non-transitory computer-readable recording medium encoded with a data distribution program according to claim 25, wherein the data distribution program further causes the computer to transmit the target data to the proxy apparatus, acquire position information indicating a position at which the target data is stored from the proxy apparatus, notify each of the one or more transmission destination apparatuses of the position information such that each of the one or more transmission destination apparatuses downloads the target data, specified by the position information, from the proxy apparatus.

31. The non-transitory computer-readable recording medium encoded with a data distribution program according to claim 25, wherein the plurality of information processing apparatuses are communicably connected to one another via a predetermined network.

32. The non-transitory computer-readable recording medium encoded with a data distribution program according to claim 25, wherein the margin corresponds to an idle condition of each information processing apparatus that is executing a job.

33. The non-transitory computer-readable recording medium encoded with a data distribution program according to claim 25, wherein the margin corresponds to an idle condition of the hardware resources.

34. The non-transitory computer-readable recording medium encoded with a data distribution program according to claim 25, wherein the proxy apparatus distributes the target data to another information processing apparatus other than the proxy apparatus.

* * * * *